(12) United States Patent
Sakhnini et al.

(10) Patent No.: US 11,751,175 B2
(45) Date of Patent: Sep. 5, 2023

(54) FACILITATING SEMI-STATIC TRANSMISSION CONFIGURATION INDICATOR (TCI) CONFIGURATION

(71) Applicant: QUALCOMM Incorporated, San Diego, CA (US)

(72) Inventors: Iyab Issam Sakhnini, San Diego, CA (US); Peter Gaal, San Diego, CA (US); Tao Luo, San Diego, CA (US); Wanshi Chen, San Diego, CA (US); Qiang Wu, San Diego, CA (US); Yuchul Kim, San Diego, CA (US); Wooseok Nam, San Diego, CA (US); Juan Montojo, San Diego, CA (US); Jelena Damnjanovic, Del Mar, CA (US); Hwan Joon Kwon, San Diego, CA (US); Mahmoud Taherzadeh Boroujeni, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 195 days.

(21) Appl. No.: 17/320,121

(22) Filed: May 13, 2021

(65) Prior Publication Data

US 2021/0360601 A1    Nov. 18, 2021

Related U.S. Application Data

(60) Provisional application No. 63/025,125, filed on May 14, 2020.

(51) Int. Cl.
*H04W 72/044* (2023.01)
*H04W 72/23* (2023.01)

(52) U.S. Cl.
CPC ......... *H04W 72/044* (2013.01); *H04W 72/23* (2023.01)

(58) Field of Classification Search
CPC . H04W 72/23; H04W 52/0216; H04W 76/27; H04W 72/21; H04W 74/04; H04W 52/16; H04W 76/25
See application file for complete search history.

(56) References Cited

U.S. PATENT DOCUMENTS

2014/0226557 A1* 8/2014 Lee .................. H04W 52/0216
                                                              370/312
2019/0306842 A1* 10/2019 Cirik .................... H04W 72/23
(Continued)

*Primary Examiner* — Chi Ho A Lee
*Assistant Examiner* — Andrew Lee
(74) *Attorney, Agent, or Firm* — Procopio, Cory, Hargreaves & Savitch LLP

(57) ABSTRACT

Apparatus, methods, and computer-readable media for facilitating semi-static TCI configurations are disclosed herein. An example method for wireless communication at a UE includes receiving, from a base station, a first downlink message including a TCI state indicator. The example method also includes initiating a timer after receiving the first downlink message including the TCI state indicator. Additionally, the example method includes receiving, after the timer expires, subsequent downlink messages using the indicated TCI state until a second downlink message including a TCI state change indication is received. An example method for wireless communication at a base station includes transmitting, to a UE, a first downlink message including a TCI state indicator. The example method also includes initiating a timer after transmitting the first downlink message including the TCI state indicator. Additionally, the example method includes transmitting, after the timer expires, subsequent downlink messages based on the indicated TCI state.

30 Claims, 11 Drawing Sheets

(56) References Cited

U.S. PATENT DOCUMENTS

| | | | |
|---|---|---|---|
| 2021/0099981 A1* | 4/2021 | Cirik | H04W 72/23 |
| 2021/0167930 A1* | 6/2021 | Jeon | H04W 76/27 |
| 2021/0219336 A1* | 7/2021 | Fan | H04W 74/04 |
| 2021/0314953 A1* | 10/2021 | Park | H04W 72/23 |
| 2021/0378045 A1* | 12/2021 | Zhang | H04W 76/25 |
| 2022/0167279 A1* | 5/2022 | Zhou | H04W 52/16 |
| 2022/0377622 A1* | 11/2022 | Zhang | H04W 72/21 |
| 2022/0394745 A1* | 12/2022 | Schober | H04W 72/23 |

* cited by examiner

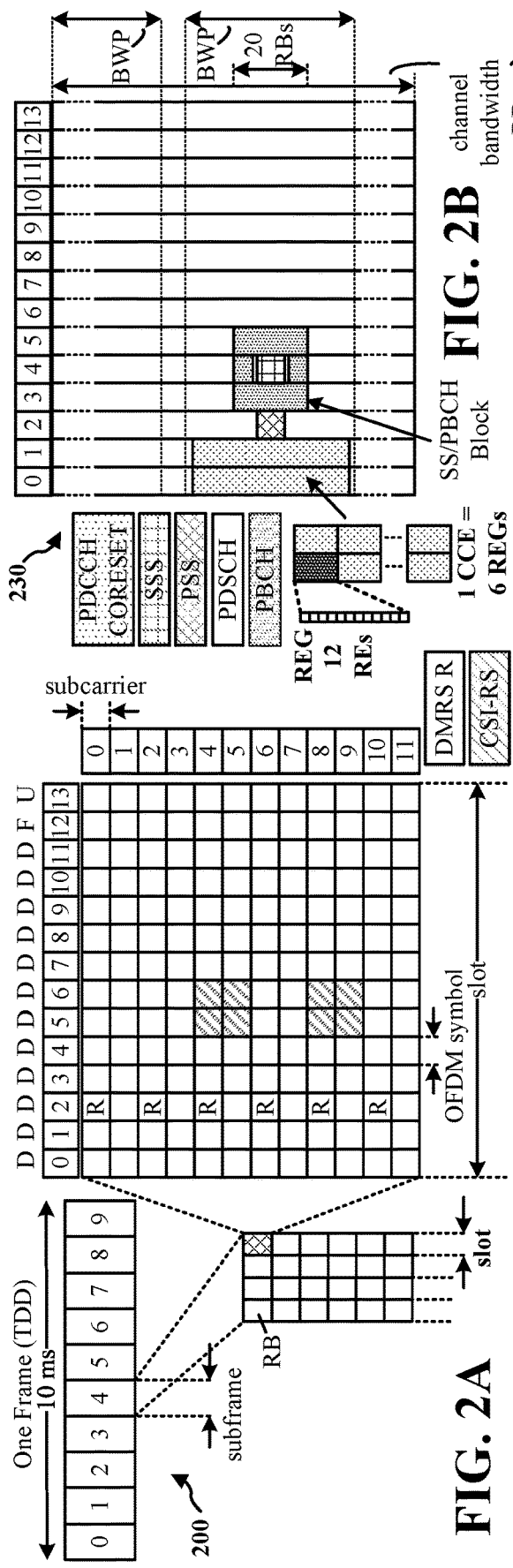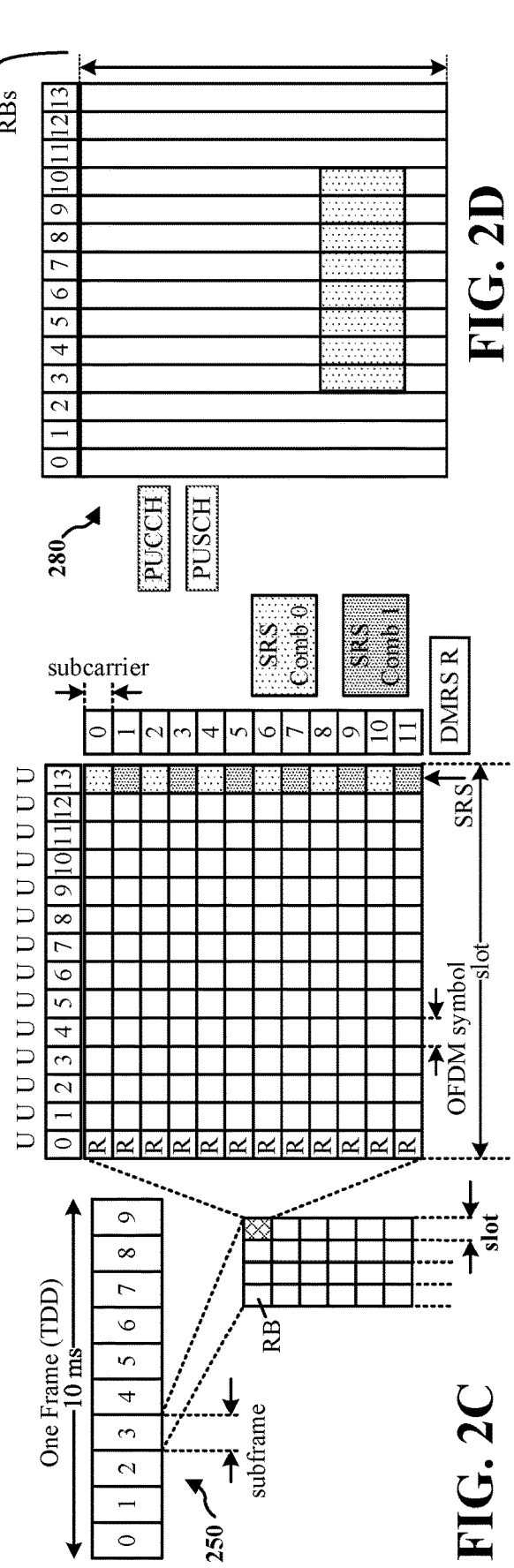

FACILITATING SEMI-STATIC TRANSMISSION CONFIGURATION INDICATOR (TCI) CONFIGURATION

CROSS REFERENCE TO RELATED APPLICATION(S)

This application claims the benefit of and priority to U.S. Provisional Application Ser. No. 63/025,125, entitled "METHODS AND APPARATUS TO FACILITATE SEMI-STATIC TRANSMISSION CONFIGURATION INDICATOR (TCI) CONFIGURATION," and filed on May 14, 2020, which is expressly incorporated by reference herein in its entirety.

TECHNICAL FIELD

The present disclosure relates generally to communication systems, and more particularly, to wireless communication including beam management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a user equipment (UE). An example apparatus receives, from a base station, a first downlink message including a TCI state indicator. The example apparatus also initiates a timer after receiving the first downlink message including the TCI state indicator. Additionally, the example apparatus receives, after the timer expires, subsequent downlink messages using the indicated TCI state until a second downlink message including a TCI state change indication is received.

In another aspect of the disclosure, a method, a computer-readable medium, and an apparatus are provided for facilitating wireless communication at a base station. An example apparatus transmits, to a UE, a first downlink message including a TCI state indicator. The example apparatus also initiates a timer after transmitting the first downlink message including the TCI state indicator. Additionally, the example apparatus transmits, to the UE after the timer expires, subsequent downlink messages based on the indicated TCI state.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
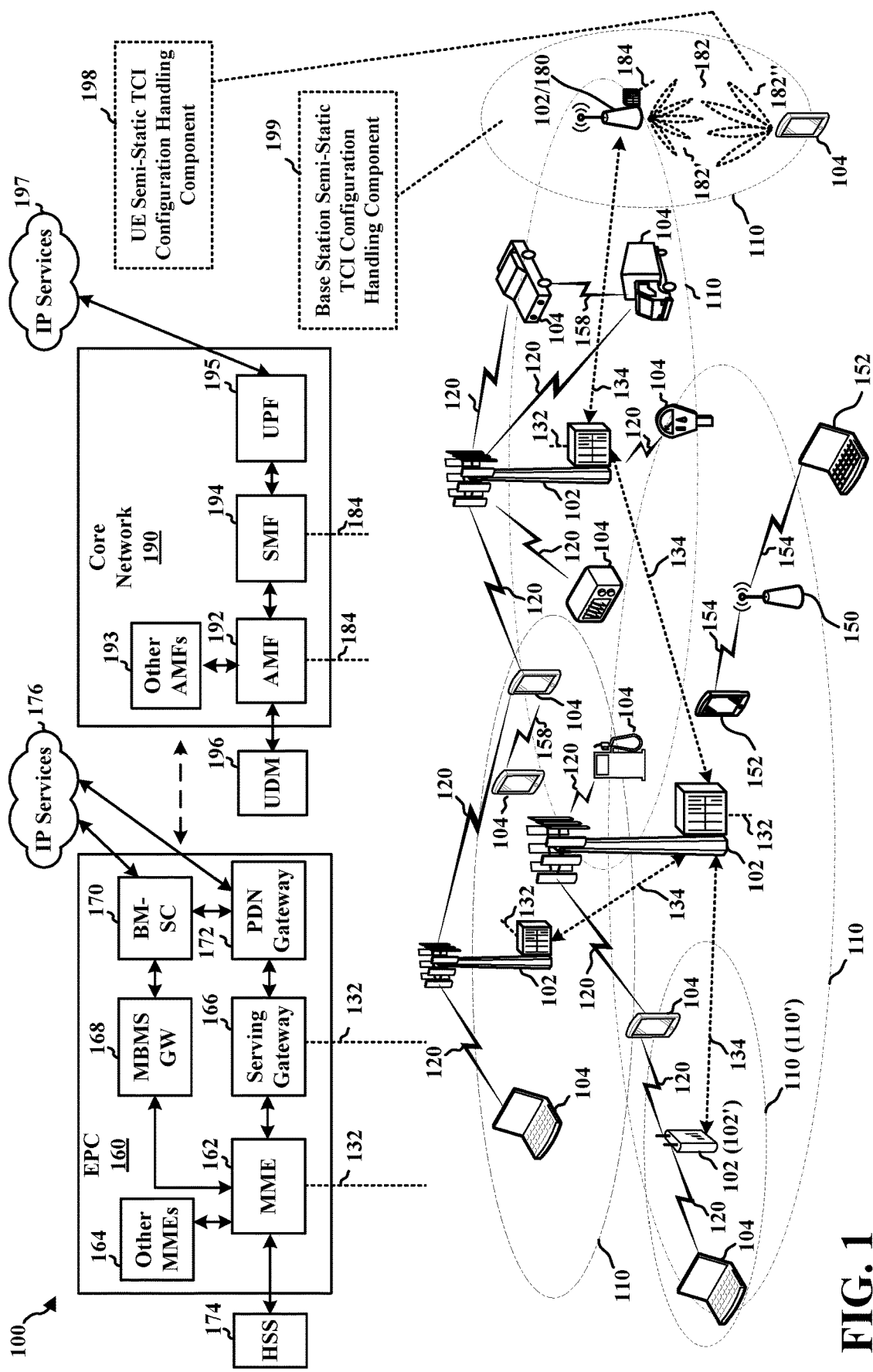
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some examples, reduced capability user equipment (UEs) within a base station coverage area may result in one or more issues. For example, the distribution of UEs within the coverage area of a base station may be such that certain beams have more UEs than other beams, which may lead to overloading of these beams. While mobile UEs may eventually balance out their distribution within the coverage area, reduced capability UEs, such as stationary devices, are fixed in their locations and, thus, may not facilitate reducing the load of certain of the beams (e.g., the overloaded beams). Additionally, in some examples, there may be more persistent interference for UEs within a beam and/or across beams. For example, with a mobile UE, the distribution of interference at any time may be random, but with a stationary device, the distribution of interference may be persistent since the stationary device is not moving.

In some examples, to facilitate efficient beam utilization and interference management, the base station may be capable of controlling the distribution of UEs among the beams using dynamic scheduling. However, using dynamic scheduling of beam assignments may result in additional overhead. For example, using dynamic beam assignment (e.g., transmission configuration indicator (TCI) state updates) may not be instantaneous and, thus, there may be a delay between when a UE receives an indication for a TCI state update and when the UE is capable of using the indicated TCI state for receiving subsequent downlink messages. For example, when using a TCI state to receive a message, there may be a delay between when a TCI state indication is received and when the UE is ready to receive the subsequent message using the indicated TCI state.

Examples disclosed herein provide techniques for reducing (or eliminating) the delay associated with when a UE receives a TCI state indication and when the UE is capable of receiving a downlink message using the indicated TCI state. For example, in some examples, when a UE receives a TCI state indication, the UE may initiate a timer that represents when the UE is capable of receiving a downlink message using the indicated TCI state. For example, when the timer expires, the UE may start using the indicated TCI state for receiving the downlink message. Example techniques disclosed herein enable the UE to refrain from initiating the timer. By refraining from initiating the timer associated with receiving some downlink messages, the UE may reduce (or eliminate) the delay associated with receiving subsequent downlink messages.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication using semi-static TCI configurations. As an example, in FIG. 1, the UE 104 may include a UE semi-static TCI configuration handling component 198. The example UE semi-static TCI configuration handling component 198 may be configured to receive, from a base station, a first downlink message including a TCI state indicator. The example UE semi-static TCI configuration handling component 198 may also be configured to initiate a timer after receiving the first downlink message including the TCI state indicator. Additionally, the example UE semi-static TCI configuration handling component 198 may be configured to receive, after the timer expires, subsequent downlink messages using the indicated TCI state until a second downlink message including a TCI state change indication is received.

In another configuration, a base station, such as the base stations 102 and 180, may be configured to manage one or more aspects of wireless communicating using semi-static TCI configuration. As an example, in FIG. 1, the base station 102/180 may include a base station semi-static TCI configuration handling component 199. The example base station semi-static TCI configuration handling component 199 may be configured to transmit, to a UE, a first downlink message including a TCI state indicator. The example base station semi-static TCI configuration handling component 199 may also be configured to initiate a timer after transmitting the first downlink message including the TCI state indicator. Additionally, the example base station semi-static TCI configuration handling component 199 may be configured to transmit, to the UE after the timer expires, subsequent downlink messages based on the indicated TCI state.

The aspects presented herein provide techniques for reducing (or eliminating) the delay associated with when a UE receives a TCI state indication and when the UE is capable of receiving a downlink message using the indicated TCI state. For example, disclosed techniques enable the UE to refrain from initiating a timer representing when the UE is capable of receiving a downlink message using an indicated TCI state. By refraining from initiating the timer associated with receiving some downlink messages, the UE may reduce (or eliminate) the delay associated with receiving subsequent downlink messages.

Although the following description may be focused on 5G NR, the concepts described herein may be applicable to other similar areas, such as LTE, LTE-A, CDMA, GSM, and/or other wireless technologies, in which a UE may be configured to perform TCI state updates.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
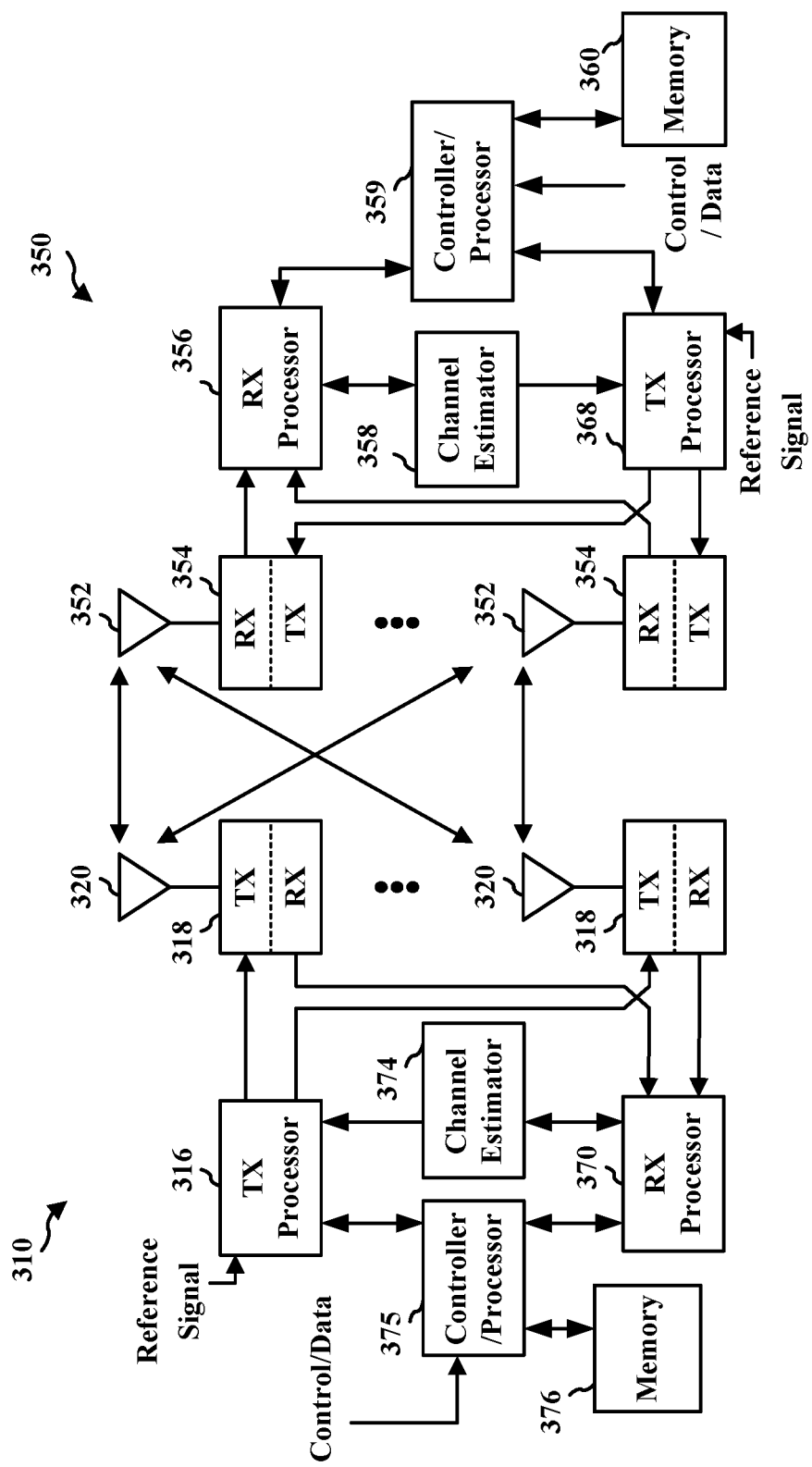
FIG. 3 is a diagram illustrating an example of a base station and a UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE semi-static TCI configuration handling component 198 of FIG. 1.

At least one of the TX processor 316, the RX processor 370, and the controller/processor 375 may be configured to perform aspects in connection with the base station semi-static TCI configuration handling component 199 of FIG. 1.

In addition to higher capability devices, wireless communication may support reduced capability devices. Among others, examples of higher capability devices include premium smartphones, V2X devices, URLLC devices, eMBB devices, etc. Among other examples, reduced capability devices may include stationary devices, wearables, industrial wireless sensor networks (IWSN), surveillance cameras, low-end smartphones, etc. For example, NR communication systems may support both higher capability devices and reduced capability devices. A reduced capability device may be referred to as an NR light device, a low-tier device, a lower tier device, etc. Reduced capability UEs may communicate based on various types of wireless communication. For example, smart wearables may transmit or receive communication based on low power wide area (LPWA)/mMTC, IoT devices may transmit or receive communication based on URLLC, sensors/cameras may transmit or receive communication based on eMBB, etc.

In some examples, a reduced capability UE may have an uplink transmission power of at least 10 dB less than that a higher capability UE. As another example, a reduced capability UE may have reduced transmission bandwidth or reception bandwidth than other UEs. For instance, a reduced capability UE may have an operating bandwidth between 5 MHz and 10 MHz for both transmission and reception, while other UEs (e.g., higher capability UEs) may have 20-100 MHz bandwidth. As a further example, a reduced capability UE may have a reduced number of reception antennas in comparison to other UEs. For example, a reduced capability UE may have a single receive antenna and may experience a lower equivalent receive signal to noise ratio (SNR) in comparison to higher capability UEs that may have multiple antennas. Reduced capability UEs may also have reduced computational complexity than other UEs.

In some examples, reduced capability UEs within a base station coverage area may result in one or more issues. For example, the distribution of UEs within the coverage area of a base station may be such that certain beams have more UEs than other beams, which may lead to overloading of these beams. While mobile UEs may eventually balance out their distribution within the coverage area, reduced capability UEs, such as stationary devices, are fixed in their locations and, thus, may not facilitate reducing the load of certain of the beams (e.g., the overloaded beams). Additionally, in some examples, there may be more persistent interference for UEs within a beam and/or across beams. For example, with a mobile UE, the distribution of interference at any time may be random, but with a stationary device, the distribution of interference may be persistent since the stationary device is not moving.

In some examples, to facilitate efficient beam utilization and interference management, the base station may be capable of controlling the distribution of UEs among the beams using dynamic scheduling. However, using dynamic scheduling of beam assignments may result in additional overhead. For example, the base station may use resources to transmit the scheduling messages to respective UEs and may also use resources for managing the different UEs. Additionally, if there is persistent interference, especially with respect to uplink transmissions, the base station may be incapable of (e.g., not have the capability of) sufficiently or efficiently providing interference management. Moreover, in some examples in which event triggering for layer 1 measurements may be used, the base station may not have received updated information.

In some examples in which semi-persistent scheduling (SPS) or configured-grant (CG) messages are used, the interference from other UEs on a beam may be predictable since the messages are transmitted on a schedule and, thus, the interference can be determined and managed. In some such examples, using dynamic scheduling for beam assignment of SPS and/or CG messages may provide unnecessary overhead.

Additionally, dynamic beam assignment (e.g., TCI state updates) may not be instantaneous and, thus, there may be a delay. For example, when using a TCI state to receive a message, there may be delay between when a TCI state indication is received and when the UE is ready to receive the subsequent message using the indicated TCI state. For example, when the base station transmits a TCI state indication to a UE using downlink control information (DCI), the base station may wait a duration before scheduling a subsequent message to the UE so that the UE is capable of receiving the subsequent message using the indicated TCI state. In some examples in which the base station transmits a TCI state indication to a UE using a medium access control—control element (MAC-CE), the base station may wait to receive an acknowledgement message (ACK) associated with the TCI state indication from the UE and wait a duration before scheduling the subsequent message to the UE. In some examples, the length of the duration may be based on a reported capability of the UE to be ready to use an indicated TCI state. In some examples, the length of the duration may be a default value or a preconfigured value, such as 3 milliseconds (ms), etc. Thus, it may be appreciated using dynamic scheduling of beam assignments may result in scheduling constraints as the base station accounts for the delays between when a TCI state is indicated and when the UE is capable of using the indicated TCI state for receiving a message.

In some examples, a "k0" offset may represent the time (e.g., slot(s)) between when a downlink control message (e.g., PDCCH) granting a TCI state is received and when the downlink data message (e.g., PDSCH) is scheduled. In some instances, it may be beneficial to set the "k0" offset to zero (e.g., k0=0). When the "k0" offset is set to zero, the PDCCH and the PDSCH are on the same slot. However, as described above, there may be delay between when the UE receives a TCI state indication and when the UE is capable of receiving the subsequent message (e.g., PDSCH) using the indicated TCI state. In some such examples, it may be appreciated that the base station and the UE may not be capable of setting the k0 offset to the zero configuration.

Examples disclosed herein provide techniques for reducing (or eliminating) the delay associated with when a UE receives a TCI state indication and when the UE is capable of receiving a downlink message using the indicated TCI state. For example, in some aspects, when a UE receives a TCI state indication, the UE may initiate a timer (e.g., a "timeDurationForQCL" timer) that represents when the UE is capable of receiving a downlink message using the indicated TCI state. When the timer expires, the UE may start using the indicated TCI state for receiving the downlink message. Example techniques disclosed herein enable the UE to refrain from initiating the timer. By refraining from initiating the timer associated with receiving some downlink messages, the UE may reduce (or eliminate) the delay associated with receiving the downlink messages.

Figure 4A:
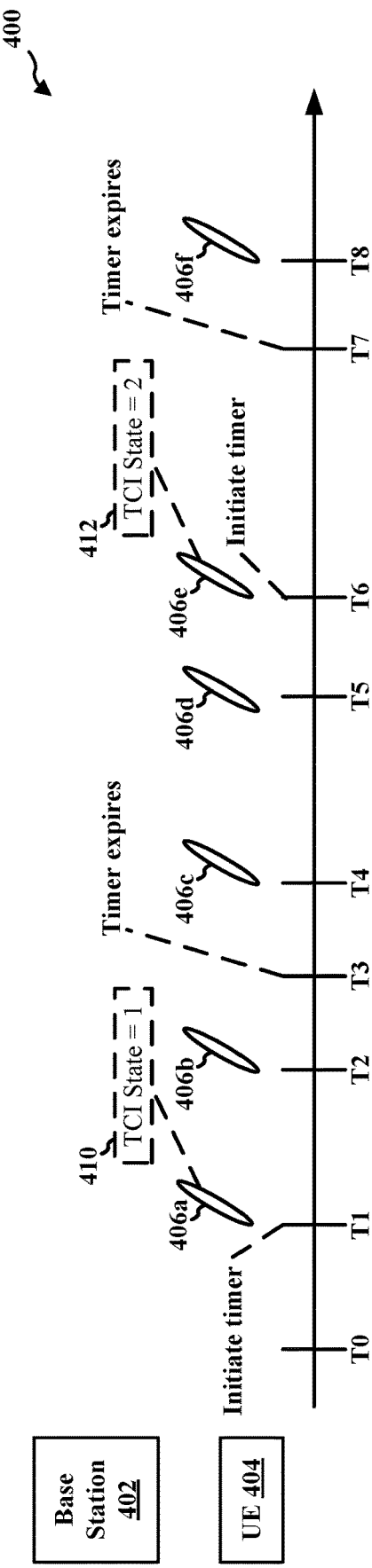
FIG. 4A depicts a first example timeline, in accordance with one or more aspects of this disclosure.

FIG. 4A depicts a first example timeline 400 illustrating a UE 404 receiving a plurality of downlink messages 406a-406f, in accordance with one or more techniques disclosed herein. The UE 404 may receive the downlink messages 406a-406f from a base station 402. Aspects of the UE 404 may be implemented by the UE 104 and/or the UE 350. Aspects of the base station 402 may be implemented by the base station 102, the base station 180, and/or the base station 310.

In the illustrated example of FIG. 4A, the UE 404 may receive a first downlink message 406a including a TCI state indication 410 at a first time T1. The first downlink message 406a may be DCI or a MAC-CE. The TCI state indication 410 may indicate a first TCI state. In the illustrated example, the TCI state indication 410 indicates that the TCI state is set to "1." The UE 404 may then initiate a first timer that expires at a third time T3. In some examples, the UE 404 may initiate the first timer after receiving the first downlink message 406a. For example, the first downlink message 406a may comprise DCI and the UE 404 may initiate the first timer after receiving the TCI state indication 410 included in the DCI. In some examples, the UE 404 may initiate the timer after transmitting an acknowledgement message after receiving the first downlink message 406a. For example, the first downlink message 406a may comprise a MAC-CE. The UE 404 may then transmit an acknowledgement message (ACK) (e.g., using an uplink control channel (PUCCH)) after successfully receiving the first downlink message 406a. The UE 404 may then initiate the first timer after transmitting the ACK.

In some examples, the duration of the timer may be based on a capability of the UE 404. For example, the UE 404 may report the timer duration ("timeDurationForQCL") to the base station 402 as a UE capability. In some examples, the duration of the timer may be a default duration or a preconfigured duration, such as 3 ms. In some examples, the UE 404 may use the reported timer duration ("timeDurationForQCL") when the TCI state indication is received in DCI. In some examples, the UE 404 may use the preconfigured timer duration (e.g., 3 ms) when the TCI state indication is received in a MAC-CE.

The UE 404 may then use the indicated TCI state (e.g., the first TCI state "1") to receive subsequent downlink messages after the timer expires. For example, the UE 404 may use the first TCI state "1" to receive a third downlink message 406c (e.g., at time T4) and a fourth downlink message 406d (e.g., at time T5). The third downlink message 406c and the fourth downlink message 406d may be downlink control messages (e.g., PDCCH), downlink data messages (e.g., PDSCH), and/or SPS messages.

In some examples, the UE 404 may continue using an indicated TCI state until a different TCI state is indicated. For example, in the illustrated first example timeline 400 of FIG. 4A, the UE 404 may receive a fifth downlink message 406e at a time T6. In the illustrated example, the fifth downlink message 406e may be DCI or a MAC-CE. In the illustrated example, the fifth downlink message 406e includes a TCI state indication 412 indicating a second TCI state (e.g., the TCI state is set to "2"). In the illustrated example, the UE 404 initiates a second timer that expires at time T7 after which the UE 404 is capable of receiving downlink messages using the second TCI state "2." For example, the UE 404 may use the second TCI state "2" to receive a sixth downlink message 406f at time T8. The sixth downlink message 406f may be a downlink control message (e.g., PDCCH), a downlink data message (e.g., PDSCH), and/or an SPS message.

In the illustrated example, the base station 402 may account for the delay associated with the timer initiated at times T1 and T6 before transmitting some of the downlink messages 406a-406f. For example, the base station 402 may wait until the first timer expires, at time T3, before transmitting the third downlink message 406c (at time T4) and the fourth downlink message 406d (at time T5) based on the first TCI state "1." The base station 402 may also wait until the second timer expires, at time T7, before transmitting the sixth downlink message 406f (at time T8) based on the second TCI state "2."

However, in some examples, the base station 402 may transmit a downlink message before an initiated timer expires. For example, in the illustrated first example timeline 400, the base station 402 may transmit a second downlink message 406b at time T2. As shown in FIG. 4A, the second downlink message 406b is received by the UE 404 after the first downlink message 406a (at time T1) and before the first timer expires (at time T3). In some such examples, the UE 404 may use a default TCI state or a preconfigured TCI state to receive downlink messages before the respective timer expires. For example, the UE 404 may use the preconfigured TCI state to receive the second downlink message 406b (at time T2) before the first timer expires (at time T3). In some examples, the preconfigured TCI state (sometimes referred to as a "default TCI state") may be configured when the UE 404 and the base station 402 are establishing a connection and/or during a reconfiguration.

In some examples, the indicated TCI state may be applicable to multiple types of messages. For example, as shown in FIG. 4A, the UE 404 may use the indicated TCI state for receiving downlink control messages, downlink data messages, and/or SPS messages. That is, the UE 404 may use the first TCI state "1" to receive the third downlink message 406c and the fourth downlink message 406d, which may be downlink control messages, downlink data messages, and/or SPS messages. In a similar manner, the UE 404 may use the second TCI state "2" to receive the sixth downlink message 406f, which may be a downlink control message, a downlink data message, and/or an SPS message.

In some examples, the indicated TCI state may be applicable to certain types of messages. For example, the UE may receive one or more respective TCI state indications for receiving one or more downlink data messages, downlink control messages, and/or SPS messages. Additionally, or alternatively, the UE may receive respective TCI state indications for receiving different SPS configurations and/or CORESET identifiers.

Figure 4B:
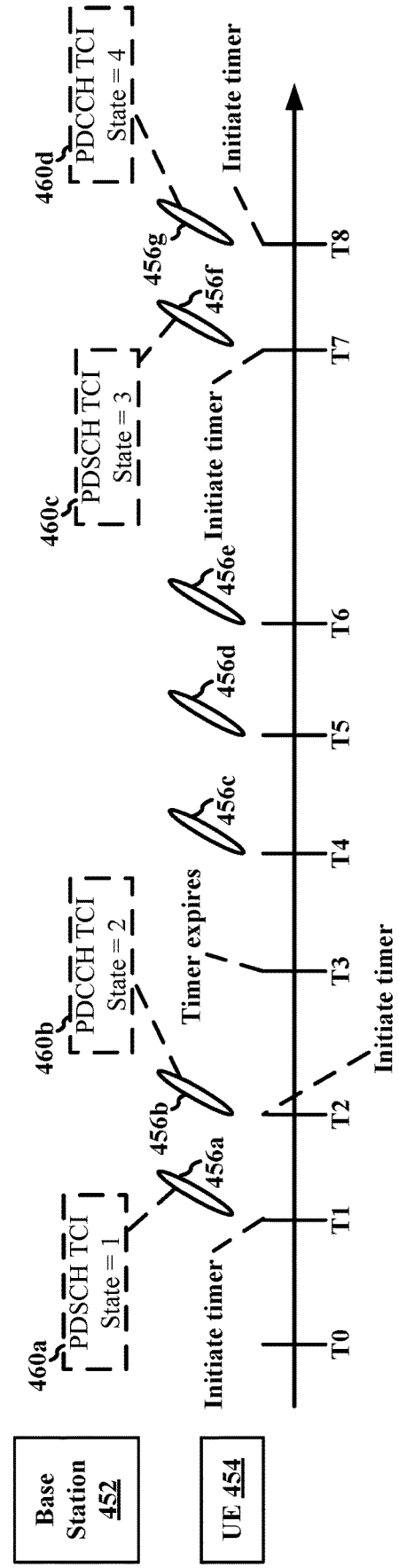
FIG. 4B depicts a second example timeline, in accordance with one or more aspects of this disclosure.

For example, FIG. 4B depicts a second example timeline 450 illustrating a UE 454 receiving a plurality of downlink messages 456a-456g, in accordance with one or more techniques disclosed herein. The UE 454 may receive the downlink messages 456a-456g from a base station 452. Aspects of the UE 454 may be implemented by the UE 104 and/or the UE 350. Aspects of the base station 452 may be implemented by the base station 102, the base station 180, and/or the base station 310.

In the illustrated example of FIG. 4B, the UE 454 may receive a first downlink message 456a including a first TCI state indication 460a at a first time T1. The first downlink message 456a may be DCI or a MAC-CE. The first TCI state indication 460a may indicate a first TCI state. In the illustrated example, the first TCI state indication 460a indicates that the first TCI state is set to "1" for receiving downlink data messages (e.g., PDSCH). The UE 454 may also receive a second downlink message 456b including a second TCI state indication 460b at a second time T2. The second downlink message 456b may be DCI or a MAC-CE. In the illustrated example, the second TCI state indication 460b indicates that the second TCI state is set to "2" for receiving downlink control messages (e.g., PDCCH). Although shown as different downlink messages and different TCI state indications, it may be appreciated that the first TCI state indication 460a and the second TCI state indication 460b may be included in a same downlink message (e.g., the first downlink message 456a and/or the second downlink message 456b).

In the illustrated example of FIG. 4B, the UE 454 may receive a third downlink message 456c at time T4, a fourth downlink message 456d at time T5, and a fifth downlink message 456e at time T6. The UE 454 may use the TCI state corresponding to the downlink messages to receive each of the respective downlink messages 456c, 456d, 456e. For example, the third downlink message 456c and the fifth downlink message 456e may be downlink data messages (e.g., PDSCH) and the fourth downlink message 456d may be a downlink control message (e.g., PDCCH). In such examples, the UE 454 may use the first TCI state "1" to receive the third downlink message 456c and the fifth downlink message 456e. The UE 454 may use the second TCI state "2" to receive the fourth downlink message 456d.

The UE 454 may then continue using the respective TCI states until a TCI state change indication is received. For example, at time T7 of FIG. 4B, the UE 454 receives a sixth downlink message 456f including a third TCI state indication 460c. The sixth downlink message 456f may be DCI or a MAC-CE. In the illustrated example, the third TCI state indication 460c indicates that a third TCI state is set to "3" for receiving downlink data messages (e.g., PDSCH). The UE 454 may also receive a seventh downlink message 456g including a fourth TCI state indication 460d at a time T8. The seventh downlink message 456g may be DCI or a MAC-CE. In the illustrated example, the fourth TCI state indication 460d indicates that a fourth TCI state is set to "4" for receiving downlink control messages (e.g., PDCCH). The UE 454 may then use the updated TCI states (e.g., the third TCI state "3" for PDSCH and the fourth TCI state "4" for PDCCH) for receiving any subsequent downlink messages.

Although shown as different downlink messages and different TCI state indications, it may be appreciated that the third TCI state indication 460c and the fourth TCI state indication 460d may be included in a same downlink message (e.g., the sixth downlink message 456f and/or the seventh downlink message 456g). Additionally, or alternatively, after receiving the first TCI state indication 460a and the second TCI state indication 460b to use for receiving respective types of downlink messages, it may be appreciated that in some examples, the UE 454 may receive a TCI state indication to use for a different combination of downlink messages. For example, at time T7, the UE 454 may receive a "blanket" TCI state indication that the UE 454 is to use for receiving all downlink messages, such as described in connection with the example of FIG. 4A.

As shown in the illustrated example of FIG. 4B, the UE 454 receives the third downlink message 456c, the fourth downlink message 456d, and the fifth downlink message 456e after a timer expires at time T3. In some examples, the UE 454 may initiate the respective timer in association with receiving the first TCI state indication 460a. In some examples, the UE 454 may initiate the respective timer in association with receiving the second TCI state indication 460b. In some examples, the UE 454 may initiate different timers in association with receiving the respective TCI state indications. For example, the UE 454 may initiate a first timer in association with receiving the first TCI state indication 460a and may initiate a second timer in association with receiving the second TCI state indication 460b. In such examples, the UE 454 may use the TCI state for receiving the corresponding downlink messages after the respective timer expires. It may be appreciated that the duration of the respective timer may be based on the reported timer duration ("timeDurationForQCL") and/or the preconfigured timer duration.

Similar to the example of FIG. 4A, the UE 454 may use a default TCI state or a preconfigured TCI state to receive downlink message(s) that are received before the respective timer expires. For example, the UE 454 may use a default TCI state or a preconfigured TCI state to receive downlink messages after the time T1 and before the timer expires (at time T3).

Although the above description of FIG. 4B provides examples in which the UE 454 receives a first TCI state indication to use for receiving downlink data messages (e.g., PDSCH) and a second TCI state indication to use for receiving downlink control messages (e.g., PDCCH), it may be appreciated that the UE 454 may receive additional or alternative TCI state indications. For example, the UE 454 may receive a first TCI state indication to use for receiving downlink data messages (e.g., PDSCH), may receive a second TCI state indication to use for receiving downlink control messages (e.g., PDCCH), and may receive a third TCI state indication to use for receiving SPS messages. Additionally, other examples may include additional or combinations for assigning one or more TCI states to one or more of downlink data messages (e.g., PDSCH), downlink control messages (e.g., PDCCH), SPS messages, SPS configurations, and/or CORESET identifiers.

Moreover, while the above description of FIGS. 4A and 4B provides examples in which certain downlink messages include a TCI state indication, in other examples, additional ones of the downlink messages may include a TCI state indication. For example, to allow for the same size of a downlink message (e.g., to use the same size for DCI), each of the downlink messages may include a TCI state indication. For example, referring to the example of FIG. 4A, the first downlink message 406a includes a TCI state indication 410 and the subsequent downlink messages 406b, 406c, 406d, may also include a respective TCI state indication. In some such examples, the respective TCI state indications included in the subsequent downlink messages 406b, 406c, 406d may indicate the same TCI state as the TCI state indication 410. For example, the respective TCI state indications included in the subsequent downlink messages 406b, 406c, 406d may indicate that the first TCI state is set to "1."

In some examples, the respective TCI state indications included in the subsequent downlink messages 406b, 406c, 406d, may include an indication (e.g., a value) that signals to the UE to reuse the previous TCI state.

In some examples, if the UE receives a downlink message including a TCI state indication that is the same as the previous TCI state indication (e.g., the first TCI state is set to "1") or receives an indication that signals to reuse the previous TCI state, the UE may continue using the TCI state for receiving the subsequent downlink message(s). The UE may also refrain from initiating the timer associated with receiving a TCI state indication. Accordingly, the UE may reduce (or eliminate) the delay associated with when a UE receives a TCI state indication and when the UE is capable of receiving a downlink message using the indicated TCI state. Additionally, disclosed techniques enable the base station and the UE to set the k0 offset to the zero configuration.

Figure 5:
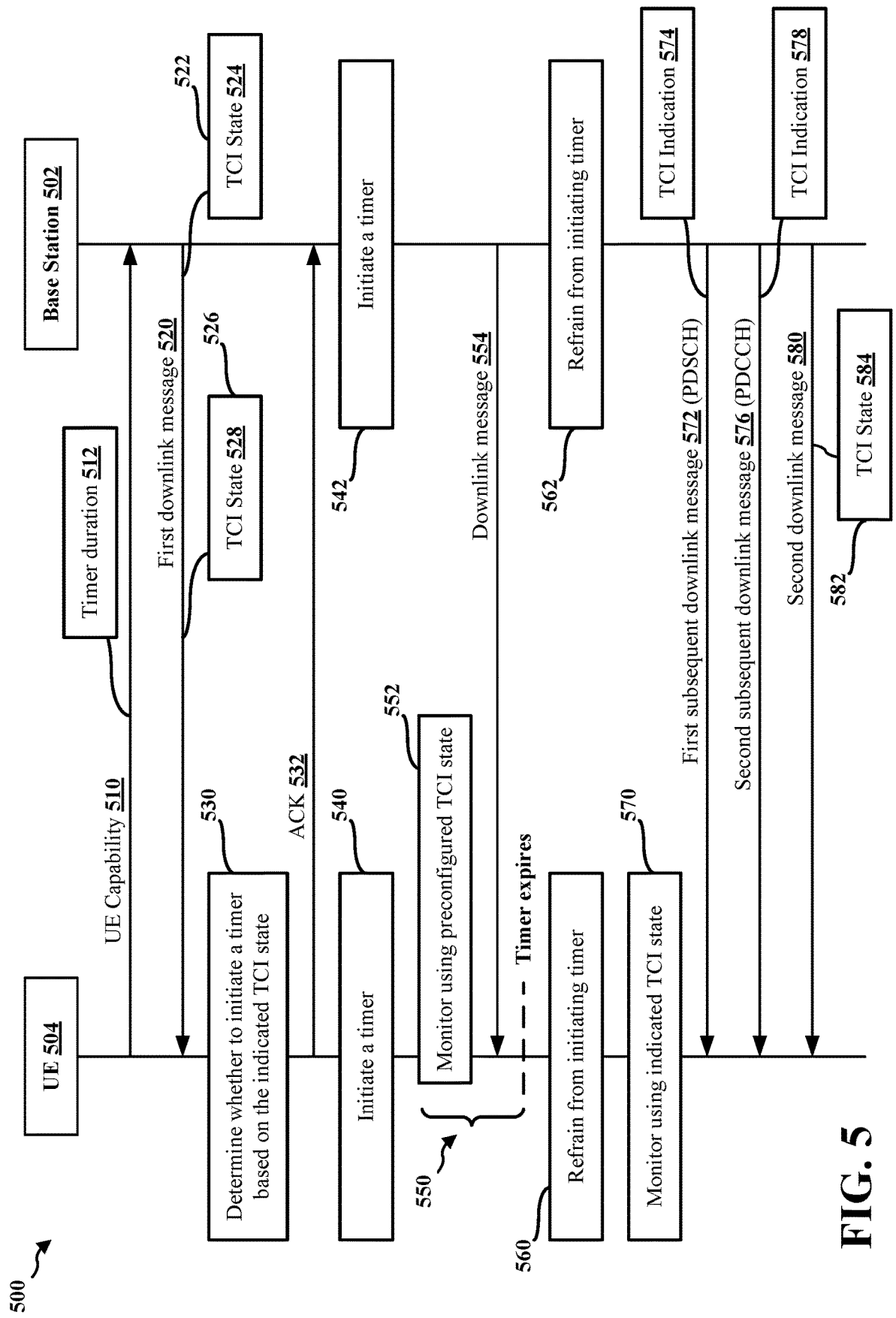
FIG. 5 is an example communication flow between a base station and a UE, in accordance with one or more aspects of this disclosure.

FIG. 5 illustrates an example communication flow 500 between a base station 502 and a UE 504, in accordance with one or more techniques disclosed herein. Aspects of the base station 502 may be implemented by the base station 102, the base station 180, and/or the base station 310. Aspects of the UE 504 may be implemented by the UE 104 and/or the UE 350. Although not shown in the illustrated example of FIG. 5, it may be appreciated that in additional or alternative examples, the base station 502 may be in communication with one or more other base stations or UEs, and/or the UE 504 may be in communication with one or more other base stations or UEs.

In the illustrated example of FIG. 5, the UE 504 may transmit a UE capability message 510 that is received by the base station 502. The UE capability message 510 may include information regarding UE capabilities of the UE 504. For example, the UE capability message 510 may indicate a timer duration 512 ("timeDurationForQCL").

In the illustrated example of FIG. 5, the base station 502 transmits a first downlink message 520 that is received by the UE 504. The first downlink message 520 may comprise DCI or a MAC-CE. Aspects of the first downlink message 520 may be similar to the first downlink message 406a of FIG. 4A and/or the first downlink message 456a of FIG. 4B. In the illustrated example of FIG. 5, the first downlink message 520 includes a TCI state indicator 522 indicating a first TCI state 524. Aspects of the TCI state indicator 522 may be similar to the TCI state indications 410, 412 of FIG. 4A and/or the TCI state indications 460a-460d of FIG. 4B. For example, the TCI state indicator 522 may set the TCI state for receiving subsequent downlink messages to "1" (e.g., TCI state="1").

At 530, the UE 504 may determine whether to initiate a timer based on the indicated TCI state. For example, the UE 504 may initiate a timer when the TCI state indicator indicates a TCI state change. For example, referring to the first example timeline 400 of FIG. 4A, the UE 504 may initiate the second timer in association with receiving the second TCI state indication 412.

In some examples, the UE 504 may transmit feedback to the base station 502 based on the first downlink message 520. For example, the first downlink message 520 may comprise a MAC-CE and the UE 504 may transmit an acknowledgement message (ACK) or a negative acknowledgement message (NACK) based on whether the UE 504 processed the first downlink message 520. In the illustrated example of FIG. 5, the UE 504 transmits an ACK 532 that is received by the base station 502 based on the UE 504 successfully processing the first downlink message 520.

In some examples, the UE 504 may initiate a timer at 540. The duration of the timer may be based on the timer duration 512 that the UE 504 reported to the base station 502. After initiating the timer, at 540, the UE 504 may incur a delay before when the UE 504 is capable of using the indicated first TCI state 524 for receiving subsequent downlink messages. For example, the UE 504 may incur a delay 550 after initiating the timer at 540. In some examples, the duration of the delay 550 may be based on a reported timer duration (e.g., the timer duration 512 ("timeDurationForQCL") included in the UE capability message 510). In some examples, the duration of the delay 550 may be based on a preconfigured timer duration (e.g., 3 ms).

In some examples, the UE 504 may receive a subsequent downlink message during the delay 550. In some such examples, the UE 504 may use a default TCI state or a preconfigured TCI state for receiving subsequent downlink messages that are received during the delay 550. For example, at 552, the UE 504 may monitor for downlink messages using a preconfigured TCI state to receive a downlink message 554 that is received during the delay 550 (e.g., while the timer at 540 is active). In some examples, the preconfigured TCI state may be configured during a connection establishment procedure between the UE 504 and the base station 502 and/or during a reconfiguration procedure between the UE 504 and the base station 502. Aspects of the delay 550 may be implemented by the interval between when the timer is initiated at time T1 and when the timer expires at time T3 of FIGS. 4A and/or 4B. Aspects of the downlink message 554 may be implemented by the second downlink message 406b of FIG. 4A.

In the illustrated example of FIG. 5, after the delay 550 (e.g., when the timer initiated at 540 expires), the UE 504 may start refraining, at 560, from initiating a timer when receiving subsequent messages. At 570, the UE 504 may monitor for downlink messages from the base station 502 using the indicated TCI state (e.g., the first TCI state 524).

Similar to aspects of the UE 504, the base station 502 may also initiate a timer to determine the TCI state to use when transmitting downlink messages. For example, at 542, the base station 502 may initiate a timer. In some examples, the duration of the timer (at 542) may be based on a reported timer duration (e.g., the timer duration 512 ("timeDurationForQCL") included in the UE capability message 510). In some examples, the duration of the timer (at 542) may be based on a preconfigured timer duration (e.g., 3 ms). Additionally, and as shown in FIG. 5, after the delay 550 (e.g., when the timer initiated at 542 expires), the base station 502 may start refraining, at 562, from initiating a timer when transmitting subsequent messages.

The base station 502 may transmit subsequent downlink messages that are received by the UE 504. In the illustrated example, the base station 502 transmits a first subsequent downlink message 572 comprising downlink data (e.g., PDSCH) and transmits a second subsequent downlink message 576 comprising downlink control information (e.g., PDCCH). Aspects of the subsequent downlink messages 572, 576 may be implemented by the subsequent downlink messages 406c, 406d, 406f of FIG. 4A and/or the subsequent downlink messages 456c, 456d, 456e of FIG. 4B.

In the illustrated example, the UE 504 may use the first TCI state 524 indicated by the TCI state indicator 522 to receive the subsequent downlink messages 572, 576. For example, the UE 504 may use the first TCI state "1" to receive the subsequent downlink messages 572, 576.

In some examples, the UE 504 may receive TCI state indicators indicating different TCI states to use for receiving certain types of downlink messages. For example, the UE 504 may receive the TCI state indicator 522 (e.g., the first TCI state indicator 460a) indicating to use the first TCI state 524 for receiving PDSCH messages. The UE 504 may also receive a second TCI state indicator 526 (e.g., the second TCI state indication 460b) indicating another TCI state 528 to use for receiving PDCCH messages. In such examples, the UE 504 may use the first TCI state 524 to receive the first subsequent downlink message 572 and may use the other TCI state 528 to receive the second subsequent downlink message 576. Although the example of FIG. 5 describes the first downlink message 520 including the TCI state indicator 522 and the second TCI state indicator 526, in other examples, the base station 502 may transmit the different TCI state indicators 522, 526 via respective downlink messages (e.g., as described above in connection with the first downlink message 456a and the second downlink message 456b of FIG. 4B).

In some examples, the subsequent downlink messages 572, 576 may include a TCI indication. For example, the first subsequent downlink message 572 includes a TCI indication 574 and the second subsequent downlink message 576 includes a TCI indication 578. In some examples, the TCI indications 574, 578 may correspond to TCI state indicators. For example, the TCI indications 574, 578 may indicate the same TCI state as the first TCI state 524 of the first downlink message 520.

In some examples, the TCI indications 574, 578 may signal to the UE 504 to reuse the indicated TCI state of a previous downlink message (e.g., the first TCI state 524 of the first downlink message 520). In some examples, the signal to the UE 504 to reuse the indicated TCI state of a previous downlink message (e.g., the first TCI state 524) may be a value that is the same size as an indicated TCI state. For example, if the TCI state indicator 522 includes six bits to indicate the first TCI state 524 to use for receiving subsequent downlink messages, then the TCI indications 574, 578 to signal to the UE 504 to reuse the indicated TCI state (e.g., the first TCI state 524) may also be six bits to conserve the size of the first downlink message 520 and the subsequent downlink messages 572, 576.

In other examples, one of the TCI indications 574, 578 may signal to the UE 504 to change TCI states. As described above, a request to change TCI states may cause the UE 504 to initiate a timer (e.g., as described above in connection with 540).

The base station 502 may transmit a second downlink message 580 that is received by the UE 504. In the illustrated example, the second downlink message 580 includes a second TCI state indicator 582 indicating a second TCI state 584 to use for receiving subsequent downlink messages. The example second TCI state indicator 582 may include a TCI state change indicator to indicate to the UE 504 to perform a TCI state update. For example, the TCI state change indicator may be an indication to use a different TCI state for receiving subsequent downlink messages. Aspects of the second downlink message 580 may be implemented by the fifth downlink message 406e of FIG. 4A and/or the downlink messages 456f, 456g of FIG. 4B. Aspects of the second TCI state indicator 582 may be implemented by the second TCI state indication 412 of FIG. 4A and/or the TCI state indications 460c, 460d of FIG. 4B. The UE 504 may initiate a timer after receiving the indication to use a different TCI state, as described in connection with 540 and the second timer at time T6 of FIG. 4A. In a similar manner, the base station 502 may initiate a timer after transmitting the indication to use a different TCI state, as described in connection with 542.

In some examples, the UE 504 may determine, at 530, that the indicated TCI state is the same as the previously indicated TCI state or the indicated TCI state is a signal to reuse the indicated TCI state of a previous downlink message. In some such examples, the UE 504 may refrain from initiating the timer (e.g., at 540). For example, referring to the first example timeline 400 of FIG. 4A, the UE may refrain from initiating the timer to facilitate receiving the downlink messages 406c, 406d, 406e. In some such examples, the UE 504 may use the indicated first TCI state 524 to receive the downlink message 554. In a similar manner, the UE 504 may refrain from initiating the timer to facilitate receiving the subsequent downlink messages 572, 576 of FIG. 5.

Figure 6:
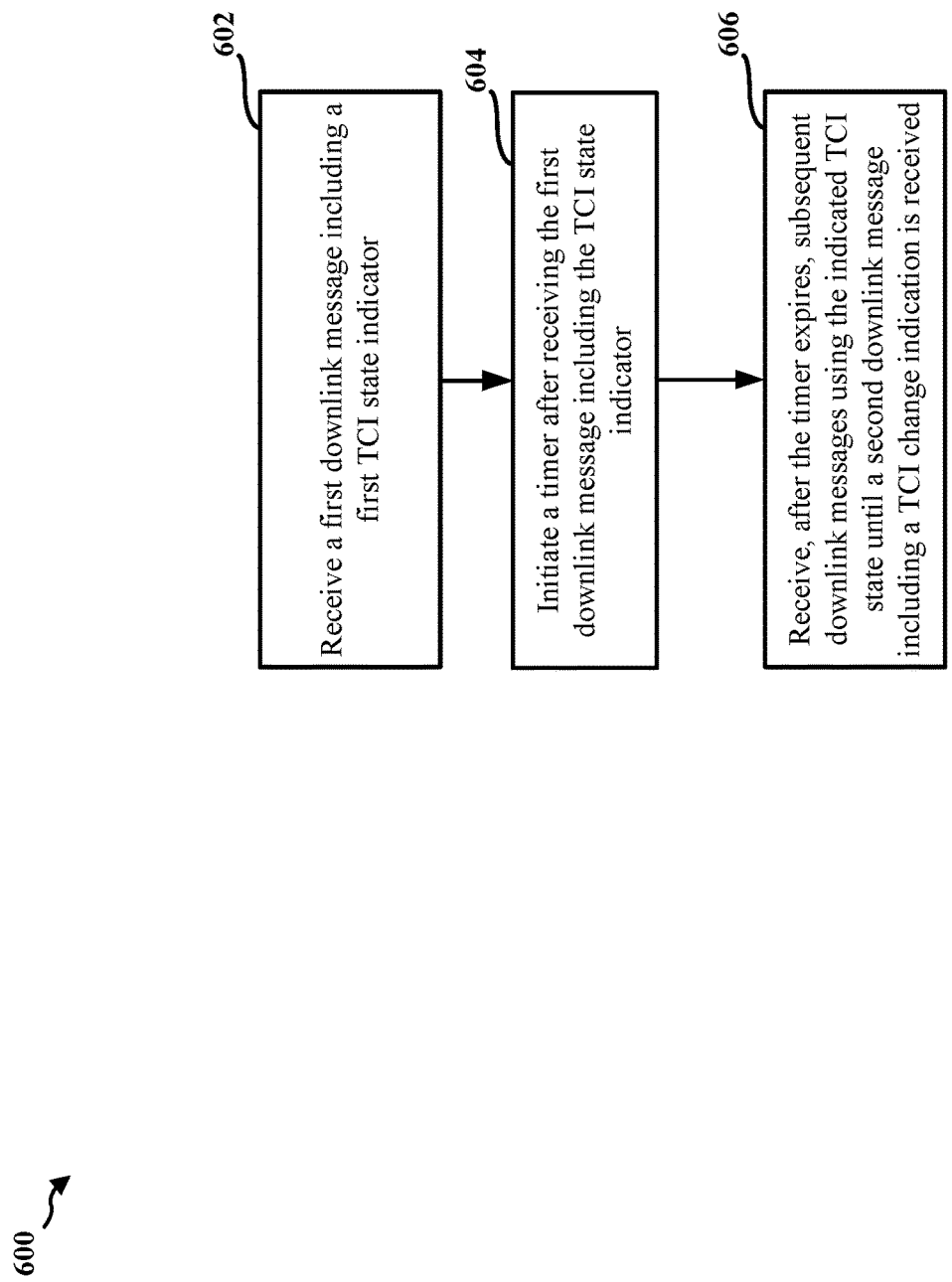
FIG. 6 is a flowchart of a method of wireless communication at a UE, in accordance with the teachings disclosed herein.

FIG. 6 is a flowchart 600 of a method of wireless communication. The method may be performed by a UE (e.g., the UE 104, the UE 350, and/or an apparatus 802 of FIG. 8). The method may enable a UE to receive downlink communication based on a TCI state in a more efficient manner.

At 602, the UE receives, from a base station, a first downlink message including a TCI state indicator, as described in connection with the first downlink message 520 including the TCI state indicator 522 indicating the first TCI state 524 of FIG. 5. The first downlink message may include DCI including the TCI state indicator. The first downlink message may include a MAC-CE including the TCI state indicator. The receiving of the first downlink message, at 602, may be performed by a reception component 830 of the apparatus 802 and/or a TCI state component 840 of the apparatus 802 of FIG. 8.

At 604, the UE initiates a timer after receiving the first downlink message including the TCI state indicator, as described in connection with 540 of FIG. 5. The initiating of the timer, at 604, may be performed by a timer initiation component 844 of the apparatus 802 of FIG. 8.

At 606, the UE receives, after the timer expires, subsequent downlink messages using the indicated TCI state until a second downlink message including a TCI state change indication is received, as described in connection with the downlink messages 406c, 406d of FIG. 4A, the downlink messages 456c, 456d, 456e of FIG. 4B, and/or the subsequent downlink messages 572, 576 of FIG. 5. The subsequent downlink messages may include downlink data messages and/or downlink control messages. In some examples, each of the subsequent downlink messages may include a TCI state indicator signaling to the UE to reuse the indicated TCI state of the first downlink message. The receiving of the subsequent downlink messages, at 606, may be performed by the reception component 830 and/or a subsequent messages component 842 of the apparatus 802 of FIG. 8.

Figure 7:
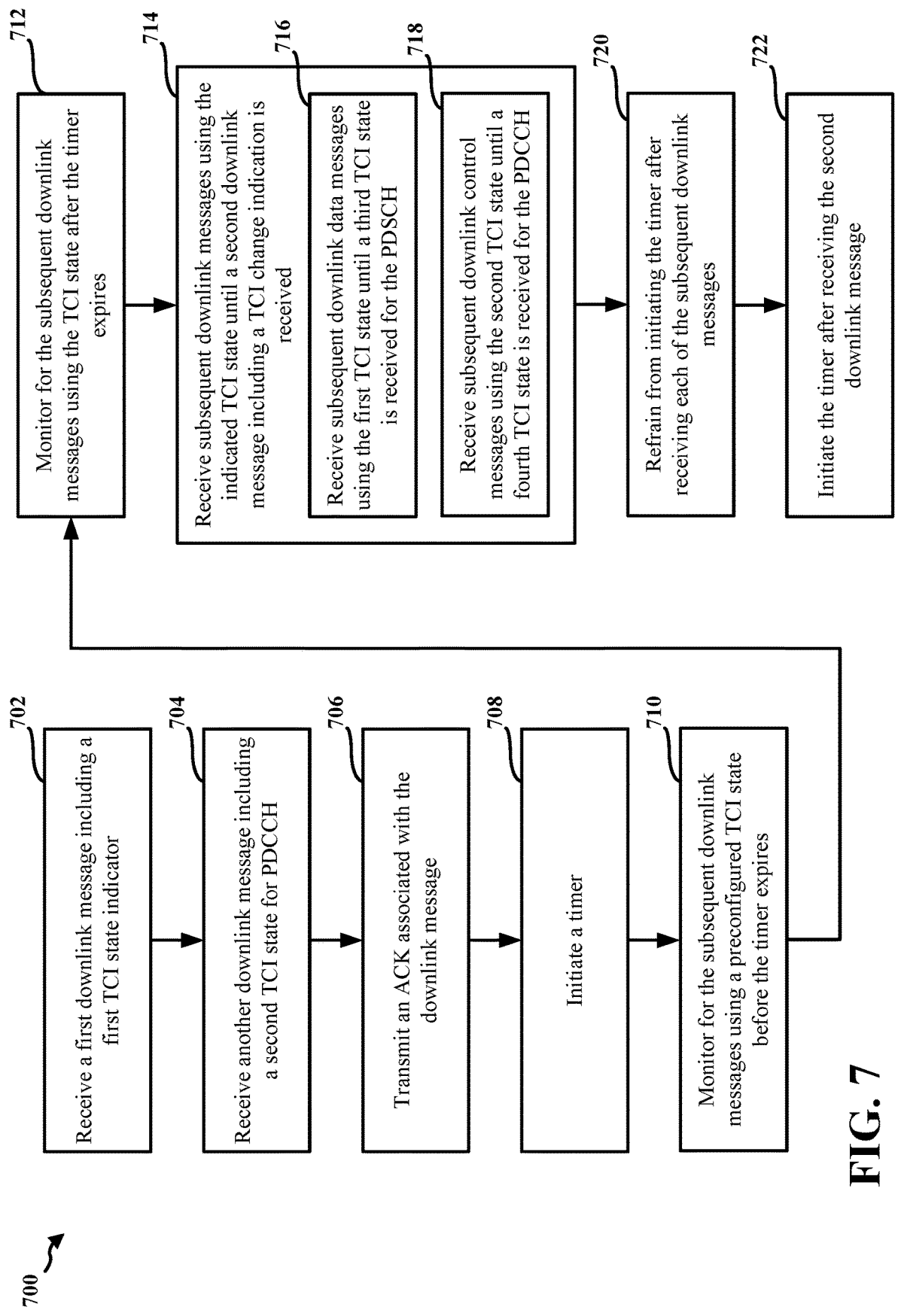
FIG. 7 is a flowchart of a method of wireless communication at a UE, in accordance with the teachings disclosed herein.

FIG. 7 is a flowchart 700 of a method of wireless communication. The method may be performed by a UE (e.g., the UE 104, the UE 350, and/or an apparatus 802 of FIG. 8). The method may enable a UE to receive downlink communication based on a TCI state in a more efficient manner.

At 702, the UE receives, from a base station, a first downlink message including a TCI state indicator, as described in connection with the first downlink message 520 including the TCI state indicator 522 indicating the first TCI state 524 of FIG. 5. The first downlink message may include DCI including the TCI state indicator. The first downlink message may include a MAC-CE including the TCI state indicator. The receiving of the first downlink message, at 702, may be performed by a reception component 830 of the apparatus 802 and/or a TCI state component 840 of the apparatus 802 of FIG. 8.

At 708, the UE initiates a timer after receiving the first downlink message including the TCI state indicator, as described in connection with 540 of FIG. 5. The initiating of the timer, at 708, may be performed by a timer initiation component 844 of the apparatus 802 of FIG. 8.

At 714, the UE receives subsequent downlink messages using the indicated TCI state until a second downlink message including a TCI state change indication is received, as described in connection with the downlink messages 406c, 406d of FIG. 4A, the downlink messages 456c, 456d, 456e of FIG. 4B, and/or the subsequent downlink messages 572, 576 of FIG. 5. The subsequent downlink messages may include downlink data messages and/or downlink control messages. The receiving of the subsequent downlink messages, at 714, may be performed by the reception component 830 and/or a subsequent messages component 842 of the apparatus 802 of FIG. 8.

In some examples, each of the subsequent downlink messages may include a TCI state indicator signaling to the UE to reuse the indicated TCI state of the first downlink message.

In some examples, the indicated TCI state may be for PDSCH and the UE may receive, at 704, another downlink message including a second TCI state for PDCCH, as described in connection with the second downlink message 456b of FIG. 4B or the TCI state indicator 522 of FIG. 5. The receiving of the second TCI state for PDCCH, at 704, may be performed by the reception component 830 and/or the TCI state component 840 of the apparatus 802 of FIG. 8.

In some examples, as illustrated in FIG. 7, using the TCI state for receiving the subsequent downlink messages (e.g., at 714) may include that the UE receives subsequent downlink data messages using the first TCI state until an indication of a third TCI state is received for the PDSCH, such as shown at 716 and as described in connection with the third downlink message 456c and the fifth downlink message 456e of FIG. 4B and/or the first subsequent downlink message 572 of FIG. 5.

In some examples, using the TCI state for receiving the subsequent downlink messages (e.g., at 714) may include that the UE receives subsequent downlink control messages using the second TCI state until an indication of a fourth TCI state is received for the PDCCH, such as shown at 718 and as described in connection with the fourth downlink message 456d of FIG. 4B and/or the second subsequent downlink message 576 of FIG. 5.

Figure 8:
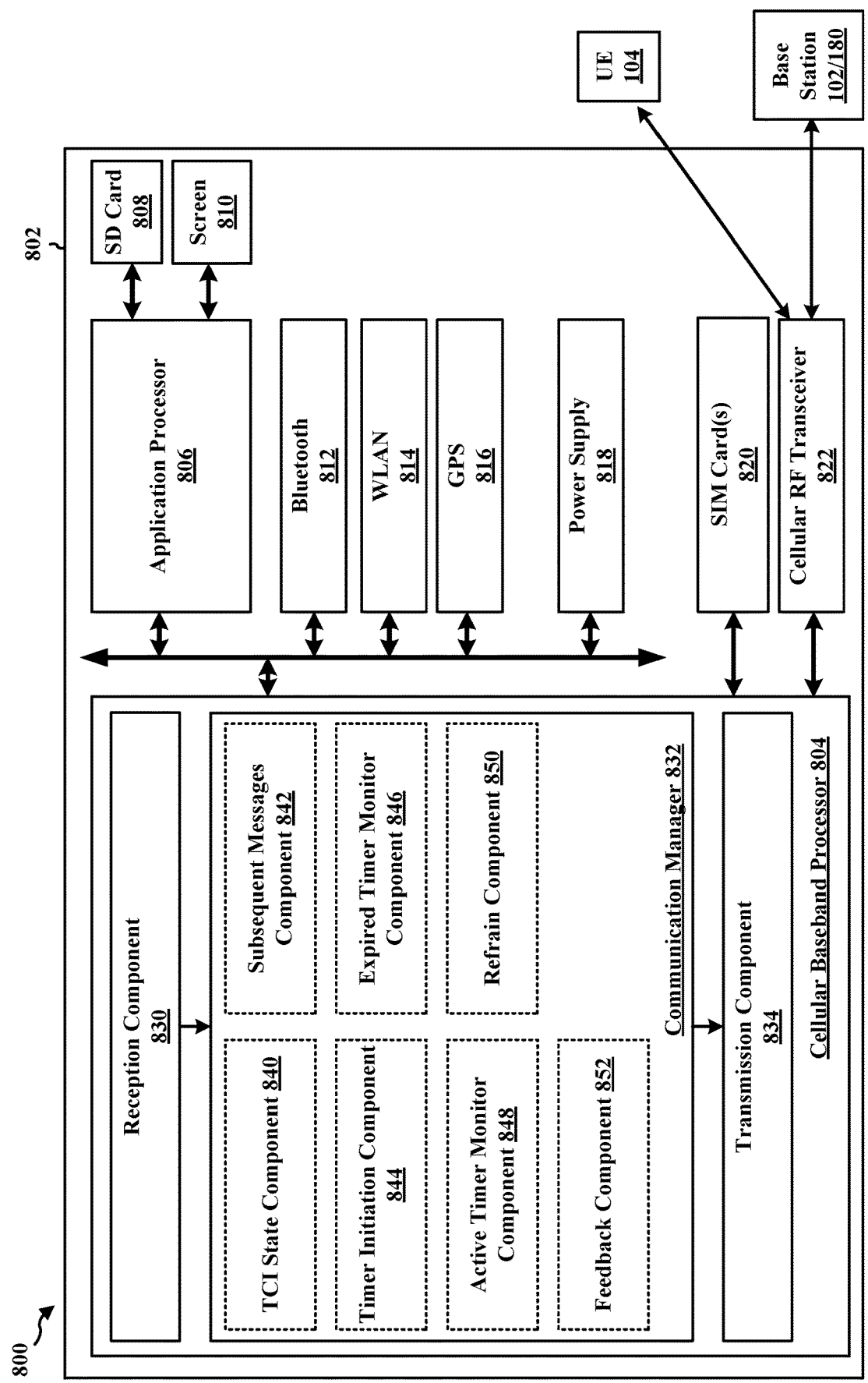
FIG. 8 is a diagram illustrating an example of a hardware implementation for an example apparatus, in accordance with the teachings disclosed herein.

The receiving of the subsequent downlink messages, at 716 and/or 718, may be performed by the reception component 830 and/or the subsequent messages component 842 of the apparatus 802 of FIG. 8.

In some examples, the state of the timer (e.g., at 708) may indicate the TCI state for the UE to use when monitoring for the subsequent downlink messages. For example, the UE may use a first TCI state when the timer is expired and may use a second TCI state when the timer is active. For example, at 712, the UE may monitor for the subsequent downlink messages using the indicated TCI state after the timer expires, as described in connection with 570 of FIG. 5. The monitoring for the subsequent downlink messages after the timer expires, at 712, may be performed by an expired timer monitor component 846 of the apparatus 802 of FIG. 8.

At 710, the UE may monitor for the subsequent downlink messages using a preconfigured TCI state before the timer expires, as described in connection with 552 of FIG. 5. For example, the UE may use a CORESET TCI state to monitor for the subsequent downlink messages before the timer expires. The monitoring of the subsequent downlink messages before the timer expires, at 710, may be performed by an active timer monitor component 848 of the apparatus 802 of FIG. 8.

In some examples, the timer (e.g., at 708) may correspond to a time duration for applying a QCL relationship, e.g., a "timeDurationForQCL" timer. The timer may be applied for TCI states indicated in DCI, for example.

In some examples, the UE may refrain, as shown at 720, from initiating the timer after receiving each of the subsequent downlink messages, as described in connection with 560 of FIG. 5. The refraining of initiating the timer, at 720, may be performed by a refrain component 850 of the apparatus 802 of FIG. 8.

In some examples, each of the subsequent downlink messages may include a TCI state indicator. In some such examples, the UE may refrain from initiating the timer (e.g., at 720) after receiving each of the subsequent downlink messages when the respective indicated TCI state indicates the same TCI state indicated in the first downlink message. In some examples, the UE may refrain from initiating the timer (e.g., at 720) after receiving each of the subsequent downlink messages when the respective subsequent downlink message signals to reuse the indicated TCI state of the first downlink message.

In some examples, the UE may initiate, at 722, the timer after receiving the second downlink message, as described in connection with the second timer at time T6 of FIG. 4A and/or in connection with receiving the second downlink message 580 of FIG. 5. The initiating of the timer after receiving the second downlink message, at 722, may be performed by the timer initiation component 844 of the apparatus 802 of FIG. 8.

In some examples, the first downlink message may comprise a MAC-CE, and the UE may further transmit an acknowledgement message associated with the first downlink message, as illustrated at 706 and as described in connection with the ACK 532 of FIG. 5. The transmitting of the acknowledgement message, at 706, may be performed by a transmission component 834 of the apparatus 802 and/or a feedback component 852 of the apparatus 802 of FIG. 8.

In some such examples, the UE may initiate a timer after transmitting the acknowledgement message, as illustrated at 708 and as described in connection with 540 of FIG. 5.

The UE may also monitor for the subsequent downlink messages after the timer expires, as illustrated at 712 and as described in connection with 570 of FIG. 5. The timer may be initiated, at 708, by the timer initiation component 844 of the apparatus 802. The monitoring after the timer expires, at 712, may be performed, at 710, by the expired timer monitor component 846 of the apparatus 802. The timer may provide a delay following the acknowledgement message before the TCI state is applied. In some examples, the UE may monitor for the subsequent downlink messages using a preconfigured TCI state before the timer expires, as illustrated at 710 and as described in connection with 552 of FIG. 5. The monitoring before the timer expires, at 710, may be performed by the active timer monitor component 848 of the apparatus 802 of FIG. 8.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see the UE 350 of FIG. 3) and include the additional modules of the apparatus 802.

The communication manager 832 includes a TCI state component 840 that is configured to receive a first downlink message including a first TCI state indicator, for example, as described in connection with 602 of FIG. 6 and/or 702 of FIG. 7. The example TCI state component 840 may also be configured to receive another downlink message including a second TCI state for PDCCH, for example, as described in connection with 704 of FIG. 7.

The communication manager 832 also includes a subsequent messages component 842 that is configured to receive subsequent downlink messages using the indicated TCI state until a second downlink message including a TCI change indication is received, for example, as described in connection with 606 of FIG. 6 and/or 714 of FIG. 7. The example subsequent messages component 842 may also be configured to receive subsequent downlink data messages using the first TCI state until a third TCI state is received for the PDSCH, for example, as described in connection with 716 of FIG. 7. The example subsequent messages component 842 may also be configured to receive subsequent downlink control messages using the second TCI state until a fourth TCI state is received for the PDCCH, for example, as described in connection with 718 of FIG. 7.

The communication manager 832 also includes a timer initiation component 844 that is configured to initiate a timer, for example, as described in connection with 604 of FIG. 6 and/or 708 of FIG. 7. The example timer initiation component 844 may also be configured to initiate the timer after receiving the second downlink message, for example, as described in connection with 722 of FIG. 7.

The communication manager 832 also includes an expired timer monitor component 846 that is configured to monitor for the subsequent downlink messages using the TCI state after the timer expires, for example, as described in connection with 712 of FIG. 7.

The communication manager 832 also includes an active timer monitor component 848 that is configured to monitor for the subsequent downlink messages using a preconfigured TCI state before the timer expires, for example, as described in connection with 710 of FIG. 7.

The communication manager 832 also includes a refrain component 850 that is configured to refrain from initiating the timer after receiving each of the subsequent downlink messages, for example, as described in connection with 720 of FIG. 7.

The communication manager 832 also includes a feedback component 852 that is configured to transmit an ACK associated with the downlink message, for example, as described in connection with 706 of FIG. 7.

The apparatus may include additional components that perform each of the blocks of the algorithm in the flowcharts of FIGS. 6 and/or 7. As such, each block in the flowcharts of FIGS. 6 and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving, from a base station, a first downlink message including a TCI state indicator. The example apparatus 802 also includes means for initiating a timer after receiving the first downlink message including the TCI state indicator. The example apparatus 802 also includes means for receiving, after the timer expires, subsequent downlink messages using the indicated TCI state until a second downlink message including a TCI state change indication is received.

In another configuration, the first downlink message includes a first TCI state for PDSCH, and the example apparatus 802 also includes means for receiving another downlink message including a second TCI state for PDCCH.

In another configuration, the example apparatus 802 also includes means for receiving subsequent downlink data messages using the first TCI state until an indication for a third TCI state is received for the PDSCH. The example apparatus 802 also includes means for receiving subsequent downlink control messages using the second TCI state until an indication for a fourth TCI state is received for the PDCCH.

In another configuration, the example apparatus 802 also includes means for monitoring for the subsequent downlink messages using the indicated TCI state after the timer expires.

In another configuration, the example apparatus 802 also includes means for refraining from initiating the timer after receiving each of the subsequent downlink messages.

In another configuration, the example apparatus 802 also includes means for initiating the timer after receiving the second downlink message.

In another configuration, the example apparatus 802 also includes means for monitoring for the subsequent downlink messages using a preconfigured TCI state before the timer expires.

In another configuration, the first downlink message comprises a MAC-CE, and the example apparatus 802 also includes means for transmitting an acknowledgement message associated with the first downlink message. The example apparatus 802 also includes means for initiating a second timer after transmitting the acknowledgement message. The example apparatus 802 also includes means for monitoring for the subsequent downlink messages using the indicated TCI state after the second timer expires. The example apparatus 802 also includes means for monitoring for the subsequent downlink messages using a preconfigured TCI state before the second timer expires.

The means may be one or more of the components of the apparatus 802 configured to perform the functions recited by the means. As described supra, the apparatus 802 may include the TX processor 368, the RX processor 356, and the controller/processor 359. As such, in one configuration, the means may be the TX processor 368, the RX processor 356, and the controller/processor 359 configured to perform the functions recited by the means.

Figure 9:
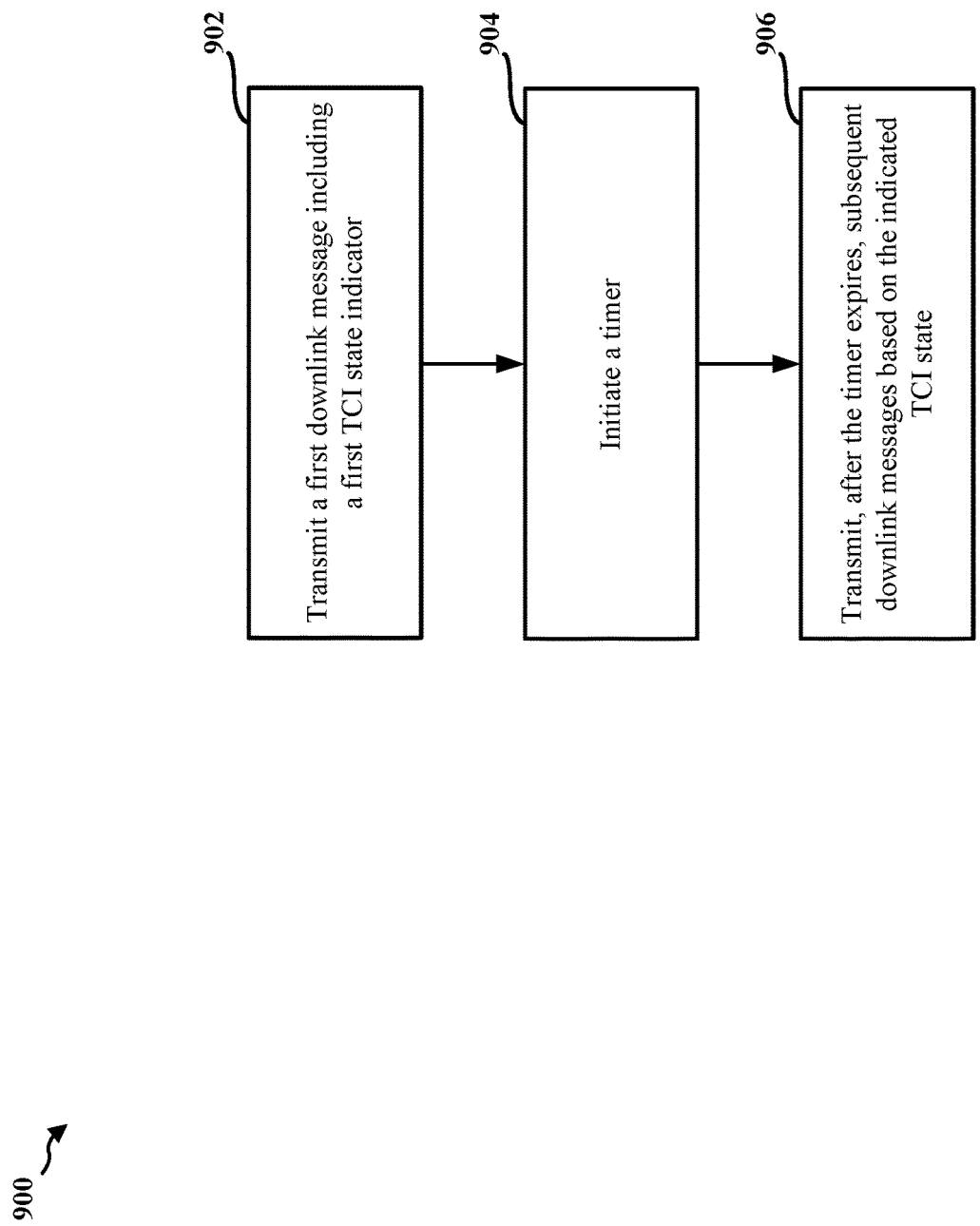
FIG. 9 is a flowchart of a method of wireless communication at a base station, in accordance with the teachings disclosed herein.

FIG. 9 is a flowchart 900 of a method of wireless communication. The method may be performed by a base station (e.g., the base station 102/180, the base station 310, and/or an apparatus 1102 of FIG. 11). The method may improve the efficient exchange of communication between a base station and a UE based on TCI states.

At 902, the base station transmits, to a UE, a first downlink message including a TCI state indicator, as described in connection with the first downlink message 520 including the TCI state indicator 522 indicating the first TCI state 524 of FIG. 5. The first downlink message may include DCI including the TCI state indicator. The first downlink message may include a MAC-CE including the TCI state indicator. The transmitting of the first downlink message, at 902, may be performed by a transmission component 1134 of the apparatus 1102 and/or a TCI state component 1140 of the apparatus 1102 of FIG. 11.

At 904, the base station initiates a timer after transmitting the first downlink message including the TCI state indicator, as described in connection with 542 of FIG. 5. The initiating of the timer, at 904, may be performed by a timer initiation component 1144 of the apparatus 1102 of FIG. 11.

At 906, the base station transmits, to the UE after the timer expires, subsequent downlink messages based on the indicated TCI state, as described in connection with the downlink messages 406c, 406d of FIG. 4A, the downlink messages 456c, 456d, 456e of FIG. 4B, and/or the subsequent downlink messages 572, 576 of FIG. 5. The subsequent downlink messages may include downlink data messages and/or downlink control messages. In some examples, each of the subsequent downlink messages may include a TCI state indicator signaling to the UE to reuse the indicated TCI state of the first downlink message. The transmitting of the subsequent downlink messages, at 906, may be performed by the reception component 1130 and/or a subsequent messages component 1142 of the apparatus 1102 of FIG. 11.

Figure 10:
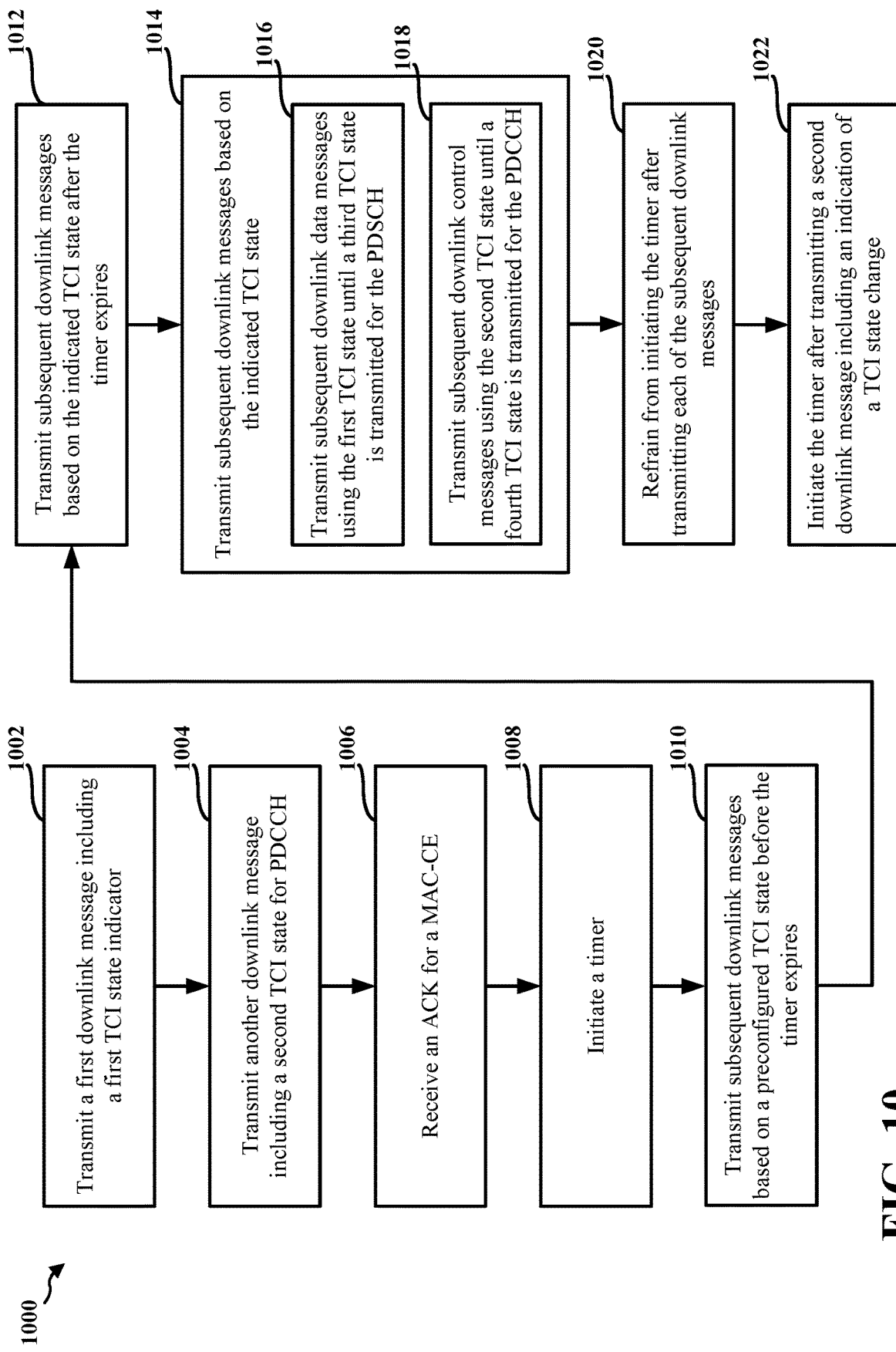
FIG. 10 is a flowchart of a method of wireless communication at a base station, in accordance with the teachings disclosed herein.

FIG. 10 is a flowchart 1000 of a method of wireless communication. The method may be performed by a base station (e.g., the base station 102/180, the base station 310, and/or an apparatus 1102 of FIG. 11). The method may improve the efficient exchange of communication between a base station and a UE based on TCI states.

At 1002, the base station transmits, to a UE, a first downlink message including a TCI state indicator, as described in connection with the first downlink message 520 including the TCI state indicator 522 indicating the first TCI state 524 of FIG. 5. The first downlink message may include DCI including the TCI state indicator. The first downlink message may include a MAC-CE including the TCI state indicator. The transmitting of the first downlink message, at 1002, may be performed by a transmission component 1134 of the apparatus 1102 and/or a TCI state component 1140 of the apparatus 1102 of FIG. 11.

At 1008, the base station initiates a timer after transmitting the first downlink message including the TCI state indicator, as described in connection with 542 of FIG. 5. The initiating of the timer, at 1008, may be performed by a timer initiation component 1144 of the apparatus 1102 of FIG. 11.

At 1014, the base station transmits, to the UE after the timer expires, subsequent downlink messages based on the indicated TCI state, as described in connection with the downlink messages 406c, 406d of FIG. 4A, the downlink messages 456c, 456d, 456e of FIG. 4B, and/or the subsequent downlink messages 572, 576 of FIG. 5. The subsequent downlink messages may include downlink data messages and/or downlink control messages. The transmitting of the subsequent downlink messages, at 1014, may be performed by the reception component 1130 and/or a subsequent messages component 1142 of the apparatus 1102 of FIG. 11.

In some examples, each of the subsequent downlink messages may include a TCI state indicator signaling to the UE to reuse the indicated TCI state of the first downlink message.

In some examples, the indicated TCI state of the first downlink message may be for PDSCH and the base station may transmit, at 1004, another downlink message including a second TCI state for PDCCH, as described in connection with the second downlink message 456b of FIG. 4B or the TCI state indicator 522 of FIG. 5. The transmitting of the second TCI state for PDCCH, at 1004, may be performed by the transmission component 1134 and/or the TCI state component 1140 of the apparatus 1102 of FIG. 11.

In some examples, as illustrated in FIG. 10, transmitting the subsequent downlink messages based on the indicated TCI state (e.g., at 1014) may include that the base station transmits subsequent downlink data messages using the first TCI state until an indication of a third TCI state is transmitted for the PDSCH, such as shown at 1016 and as described in connection with the third downlink message 456c and the fifth downlink message 456e of FIG. 4B and/or the first subsequent downlink message 572 of FIG. 5.

In some examples, transmitting the subsequent downlink messages based on the indicated TCI state (e.g., at 1014) may include that the base station transmits subsequent downlink control messages using the second TCI state until an indication of a fourth TCI state is transmitted for the PDCCH, such as shown at 1018 and as described in connection with the fourth downlink message 456d of FIG. 4B and/or the second subsequent downlink message 576 of FIG. 5.

Figure 11:
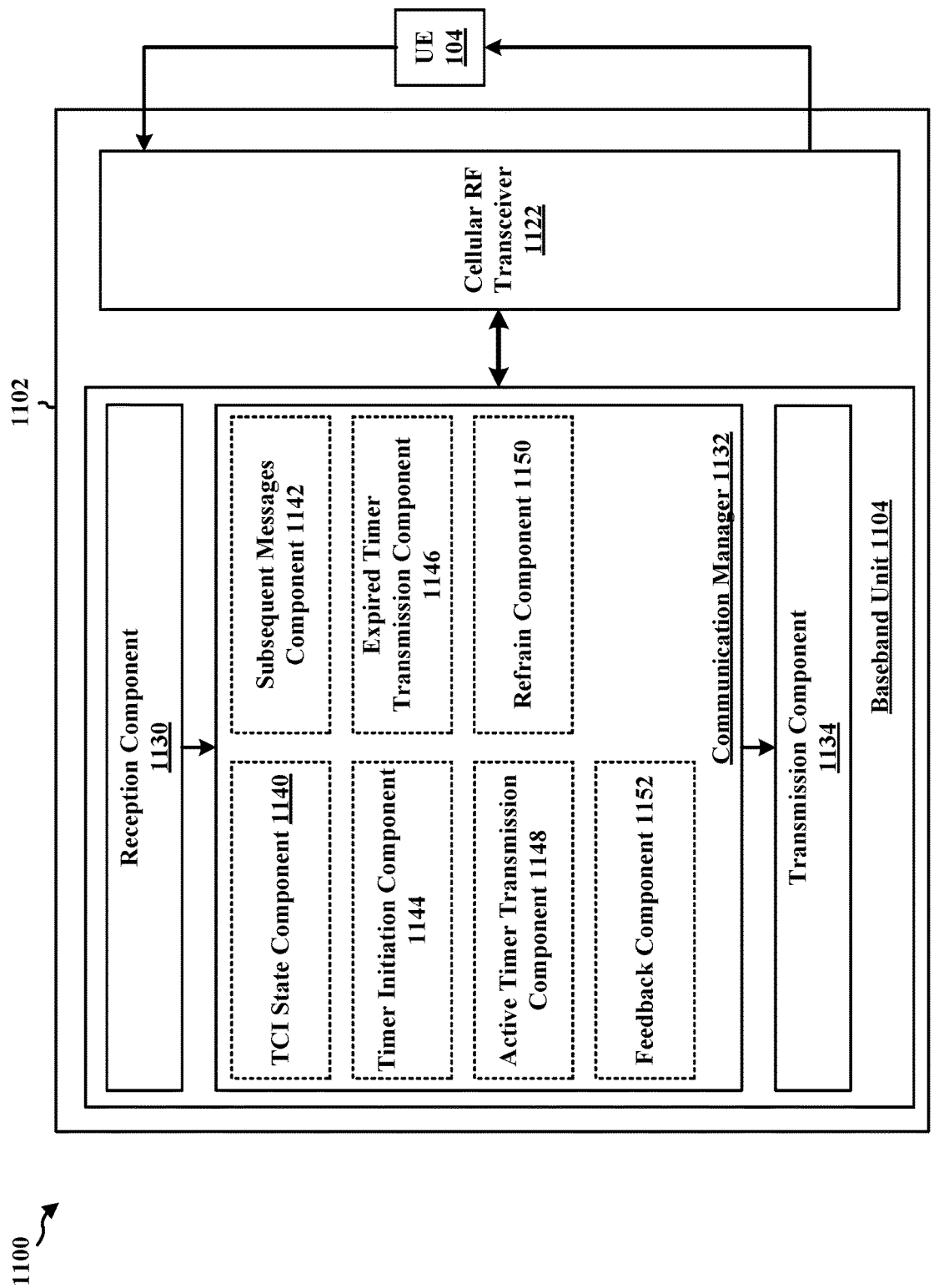
FIG. 11 is a diagram illustrating an example of a hardware implementation for an example apparatus, in accordance with the teachings disclosed herein.

The receiving of the subsequent downlink messages, at 1016 and/or 1018, may be performed by the transmission component 1134 and/or the subsequent messages component 1142 of the apparatus 1102 of FIG. 11.

In some examples, the state of the timer (e.g., at 1008) may indicate the TCI state for the base station to use when transmitting the subsequent downlink messages. For example, at 1012, the base station may transmit the subsequent downlink messages based on the indicated TCI state after the timer expires, as described in connection with the subsequent downlink messages 572, 576 of FIG. 5. The transmitting of the subsequent downlink messages after the timer expires, at 1012, may be performed by an expired timer transmission component 1146 of the apparatus 1102 of FIG. 11.

At 1010, the base station may transmit the subsequent downlink messages based on a preconfigured TCI state before the timer expires, as described in connection with the downlink message 554 of FIG. 5. For example, the base station may use a default TCI state, such as a CORESET TCI state, to transmit the subsequent downlink messages before the timer expires. The transmitting of the subsequent downlink messages before the timer expires, at 1010, may be performed by an active timer transmission component 1148 of the apparatus 1102 of FIG. 11.

In some examples, the timer (e.g., at 1008) may correspond to a time duration for applying a QCL relationship, e.g., a "timeDurationForQCL" timer. The timer may be applied for TCI states indicated in DCI, for example.

In some examples, the base station may refrain, as shown at 1020, from initiating the timer after receiving each of the subsequent downlink messages, as described in connection with 562 of FIG. 5. The refraining of initiating the timer, at 1020, may be performed by a refrain component 1150 of the apparatus 1102 of FIG. 11.

In some examples, each of the subsequent downlink messages may include a TCI state indicator. In some such examples, the base station may refrain from initiating the timer (e.g., at 1020) after transmitting each of the subsequent downlink messages when the respective indicated TCI state indicates the same TCI state indicated in the first downlink message. In some examples, the base station may refrain from initiating the timer (e.g., at 1020) after transmitting each of the subsequent downlink messages when the respective subsequent downlink message signals to the UE to reuse the indicated TCI state of the first downlink message.

In some examples, the UE may initiate, at 1022, the timer after transmitting a second downlink message including an indication of a TCI state change, as described in connection with the second timer at time T6 of FIG. 4A and/or in connection with transmitting the second downlink message 580 of FIG. 5. The initiating of the timer after transmitting the second downlink message, at 1022, may be performed by the timer initiation component 1144 of the apparatus 1102 of FIG. 11.

In some examples, the first downlink message may comprise a MAC-CE indicating the TCI state. The transmitting of the first downlink message comprising the MAC-CE indicating the TCI state, at 1002, may be performed by the transmission component 1134 of the apparatus 1102 and/or the TCI state component 1140 of the apparatus 1102 of FIG. 11. The base station may receive an acknowledgement message associated with the first downlink message, as illustrated at 1006 and as described in connection with the ACK 532 of FIG. 5. The receiving of the acknowledgement message, at 1006, may be performed by a reception component 1130 of the apparatus 1102 and/or a feedback component 1152 of the apparatus 1102 of FIG. 11.

In some such examples, the base station may initiate a timer after receiving the acknowledgement message, as illustrated at 1008 and as described in connection with 542 of FIG. 5. The initiating of the timer, at 1008, may be performed by the timer initiation component 1144 of the apparatus 1102 of FIG. 11.

Then, the base station may transmit the subsequent downlink messages, at 1014, using the indicated TCI state after the timer expires, as illustrated at 1012. The transmitting of the subsequent downlink messages after the timer expires, at 1012, may be performed by the expired timer transmission component 1146 of the apparatus 1102 of FIG. 11.

Additionally, or alternatively, the base station may transmit the subsequent downlink messages, at 1014, using a preconfigured TCI state before the timer expires, as illustrated at 1010. The timer may provide a delay following the ACK before the TCI state is applied. The transmitting of the subsequent downlink messages before the timer expires, at 1010, may be performed by the active timer transmission component 1148 of the apparatus 1102 of FIG. 11.

FIG. 11 is a diagram 1100 illustrating an example of a hardware implementation for an apparatus 1102. The apparatus 1102 may be a base station, a component of a base station, or may implement base station functionality. In some aspects, the apparatus 802 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a TCI state component 1140 that is configured to transmit a first downlink message including a first TCI state indicator, for example, as described in connection with 902 of FIG. 9 and/or 1002 of FIG. 10. The example TCI state component 1140 may also be configured to transmit another downlink message including a second TCI state for PDCCH, for example, as described in connection with 1004 of FIG. 10.

The communication manager 1132 also includes a subsequent messages component 1142 that is configured to transmit subsequent downlink messages based on the indicated TCI state, for example, as described in connection with 906 of FIG. 9 and/or 1014 of FIG. 10. The example subsequent messages component 1142 may also be configured to transmit subsequent downlink data messages using the first TCI state until a third TCI state is transmitted for the PDSCH, for example, as described in connection with 1016 of FIG. 10. The example subsequent messages component 1142 may also be configured to transmit subsequent downlink control messages using the second TCI state until a fourth TCI state is transmitted for the PDCCH, for example, as described in connection with 1018 of FIG. 10.

The communication manager 1132 also includes a timer initiation component 1144 that is configured to initiate a timer, for example, as described in connection with 904 of FIG. 9 and/or 1008 of FIG. 10. The example timer initiation component 1144 may also be configured to initiate the timer after transmitting a second downlink message including an indication of a TCI state change, for example, as described in connection with 1022 of FIG. 10.

The communication manager 1132 also includes an expired timer transmission component 1146 that is configured to transmit subsequent downlink messages based on the indicated TCI state after the timer expires, for example, as described in connection with 1012 of FIG. 10.

The communication manager 1132 also includes an active timer transmission component 1148 that is configured to transmit subsequent downlink messages based on a preconfigured TCI state before the timer expires, for example, as described in connection with 1010 of FIG. 10.

The communication manager 1132 also includes a refrain component 1150 that is configured to refrain from initiating the timer after transmitting each of the subsequent downlink messages, for example, as described in connection with 1020 of FIG. 10.

The communication manager 1132 also includes a feedback component 1152 that is configured to receive an ACK for a MAC-CE, for example, as described in connection with 1006 of FIG. 10.

The apparatus may include additional components that perform each of the blocks of the algorithm in the flowcharts of FIG. 9 and/or 10. As such, each block in the flowcharts of FIG. 9 and/or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a UE, a first downlink message including a TCI state indicator. The example apparatus 1102 also includes means for initiating a timer after transmitting the first downlink message including the TCI state indicator. The example apparatus 1102 also includes means for transmitting, to the UE after the timer expires, subsequent downlink messages based on the indicated TCI state.

In another configuration, the first downlink message includes a first TCI state for a PDSCH, and the example apparatus 1102 also includes means for transmitting another downlink message including a second TCI state for a PDCCH. The example apparatus 1102 also includes means for transmitting downlink data messages based on the first TCI state until an indication of a third TCI state is transmitted for the PDSCH. The example apparatus 1102 also includes means for transmitting downlink control messages based on the second TCI state until an indication of a fourth TCI state is transmitted for the PDCCH.

In another configuration, the example apparatus 1102 also includes means for transmitting the subsequent downlink messages based on a preconfigured TCI state before the timer expires.

In another configuration, the example apparatus 1102 also includes means for refraining from initiating the timer after transmitting each of the subsequent downlink messages.

In another configuration, the example apparatus 1102 also includes means for initiating the timer after transmitting a second downlink message including an indication of a TCI state change.

In another configuration, the first downlink message comprises a MAC-CE, and the example apparatus 1102 also includes means for initiating a second timer after receiving an acknowledgement message associated with the first downlink message, and where the subsequent downlink messages are transmitted using the indicated TCI state after the second timer expires or transmitted using a preconfigured TCI state before the second timer expires.

The means may be one or more of the components of the apparatus 1102 configured to perform the functions recited by the means. As described supra, the apparatus 1102 may include the TX processor 316, the RX processor 370, and the controller/processor 375. As such, in one configuration, the means may be the TX processor 316, the RX processor 370, and the controller/processor 375 configured to perform the functions recited by the means.

The aspects presented herein provide techniques for reducing (or eliminating) the delay associated with when a UE receives a TCI state indication and when the UE is capable of receiving a downlink message using the indicated TCI state. For example, disclosed techniques enable the UE to refrain from initiating a timer representing when the UE is capable of receiving a downlink message using an indicated TCI state. By refraining from initiating the timer associated with receiving some downlink messages, the UE may reduce (or eliminate) the delay associated with receiving subsequent downlink messages.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, a first downlink message including a TCI state indicator; initiate a timer after receiving the first downlink message including the TCI state indicator; and receive, after the timer expires, subsequent downlink messages using the indicated TCI state until a second downlink message including a TCI state change indication is received.

Aspect 2 is the apparatus of aspect 1, further including that the first downlink message comprises: a DCI including the TCI state indicator, or a MAC-CE including the TCI state indicator.

Aspect 3 is the apparatus of any of aspects 1 and 2, further including that the subsequent downlink messages include downlink data messages and downlink control messages.

Aspect 4 is the apparatus of any of aspects 1 to 3, further including that the first downlink message includes a first TCI state for a PDSCH, and the at least one processor is further configured to: receive another downlink message including a second TCI state for a PDCCH.

Aspect 5 is the apparatus of any of aspects 1 to 4, further including that to use the TCI state for receiving the subsequent downlink messages, the at least one processor is further configured to: receive subsequent downlink data messages using the first TCI state until an indication for a third TCI state is received for the PDSCH; and receive subsequent downlink control messages using the second TCI state until an indication for a fourth TCI state is received for the PDCCH.

Aspect 6 is the apparatus of any of aspects 1 to 5, further including that each of the subsequent downlink messages includes a TCI state indicator signaling to the UE to reuse the indicated TCI state of the first downlink message.

Aspect 7 is the apparatus of any of aspects 1 to 6, further including that the at least one processor is further configured to: monitor for the subsequent downlink messages using the indicated TCI state after the timer expires.

Aspect 8 is the apparatus of any of aspects 1 to 7, further including that the at least one processor is further configured to: refrain from initiating the timer after receiving each of the subsequent downlink messages.

Aspect 9 is the apparatus of any of aspects 1 to 8, further including that the at least one processor is further configured to: initiate the timer after receiving the second downlink message.

Aspect 10 is the apparatus of any of aspects 1 to 9, further including that the at least one processor is further configured to: monitor for the subsequent downlink messages using a preconfigured TCI state before the timer expires.

Aspect 11 is the apparatus of any of aspects 1 to 10, further including that each of the subsequent downlink messages includes a TCI state indicator, and wherein the at least one processor is further configured to: refrain from initiating the timer after receiving each of the subsequent downlink messages when the respective indicated TCI state indicates a same TCI state as indicated in the first downlink message.

Aspect 12 is the apparatus of any of aspects 1 to 11, further including that each of the subsequent downlink messages includes a TCI state indicator, and wherein the at least one processor is further configured to: refrain from initiating the timer after receiving each of the subsequent downlink messages when the subsequent downlink messages signal to reuse the indicated TCI state of the first downlink message.

Aspect 13 is the apparatus of any of aspects 1 to 12, further including that the first downlink message comprises a MAC-CE, and the at least one processor is further configured to: transmit an acknowledgement message associated with the first downlink message; initiate a second timer after transmitting the acknowledgement message; and monitor for the subsequent downlink messages using the indicated TCI state after the second timer expires.

Aspect 14 is the apparatus of any of aspects 1 to 13, further including that the at least one processor is further configured to: monitor for the subsequent downlink messages using a preconfigured TCI state before the second timer expires.

Aspect 15 is a method of wireless communication for implementing any of aspects 1 to 14.

Aspect 16 is an apparatus for wireless communication including means for implementing any of aspects 1 to 14.

Aspect 17 is a non-transitory computer-readable storage medium storing computer executable code, where the code, when executed, causes a processor to implement any of aspects 1 to 14.

Aspect 18 is an apparatus for wireless communication at a base station including at least one processor coupled to a memory and configured to transmit, to a UE, a first downlink message including a TCI state indicator; initiate a timer after transmitting the first downlink message including the TCI state indicator; and transmit, to the UE after the timer expires, subsequent downlink messages based on the indicated TCI state.

Aspect 19 is the apparatus of aspect 18, further including that the first downlink message comprises: a DCI including the TCI state indicator, or a MAC-CE including the TCI state indicator.

Aspect 20 is the apparatus of any of aspects 18 and 19, further including that the subsequent downlink messages include downlink data messages and downlink control messages.

Aspect 21 is the apparatus of any of aspects 18 to 20, further including that the first downlink message includes a first TCI state for a PDSCH, and the at least one processor is further configured to: transmit another downlink message including a second TCI state for a PDCCH.

Aspect 22 is the apparatus of any of aspects 18 to 21, further including that to transmit the subsequent downlink messages, the at least one processor is further configured to: transmit downlink data messages based on the first TCI state until an indication of a third TCI state is transmitted for the PDSCH; and transmit downlink control messages based on the second TCI state until an indication of a fourth TCI state is transmitted for the PDCCH.

Aspect 23 is the apparatus of any of aspects 18 to 22, further including that each of the subsequent downlink messages includes a TCI state indicator signaling to the UE to reuse the indicated TCI state of the first downlink message.

Aspect 24 is the apparatus of any of aspects 18 to 23, further including that the at least one processor is further configured to: transmit the subsequent downlink messages based on a preconfigured TCI state before the timer expires.

Aspect 25 is the apparatus of any of aspects 18 to 24, further including that the at least one processor is further configured to: refrain from initiating the timer after transmitting each of the subsequent downlink messages.

Aspect 26 is the apparatus of any of aspects 18 to 25, further including that the at least one processor is further configured to: initiate the timer after transmitting a second downlink message including an indication of a TCI state change.

Aspect 27 is the apparatus of any of aspects 18 to 26, further including that each of the subsequent downlink messages includes a TCI state indicator, and wherein the at least one processor is further configured to: refrain from initiating the timer after transmitting each of the subsequent downlink messages when the respective indicated TCI state indicates a same TCI state as indicated in the first downlink message or signals to the UE to reuse the indicated TCI state of the first downlink message.

Aspect 28 is the apparatus of any of aspects 18 to 27, further including that the first downlink message comprises a MAC-CE, and wherein the at least one processor is further configured to: initiate a second timer after receiving an acknowledgement message associated with the first downlink message, and wherein the subsequent downlink messages are transmitted using the indicated TCI state after the second timer expires or transmitted using a preconfigured TCI state before the second timer expires.

Aspect 29 is a method of wireless communication for implementing any of aspects 18 to 28.

Aspect 30 is an apparatus for wireless communication including means for implementing any of aspects 18 to 28.

Aspect 31 is a non-transitory computer-readable storage medium storing computer executable code, where the code, when executed, causes a processor to implement any of aspects 18 to 28.

What is claimed is:

1. A method of wireless communication at a user equipment (UE), comprising:
   receiving, from a base station, a first downlink message including a first transmission configuration indicator (TCI) state indicator indicating a first TCI state for a first channel;
   receiving a second downlink message including a second TCI state indicator indicating a second TCI state for a second channel;
   initiating a timer after receiving the first downlink message including the first TCI state indicator; and
   receiving, after the timer expires, subsequent downlink messages using respective TCI states until at least a third downlink message including a TCI state change indication is received, wherein receiving the subsequent downlink messages includes:
   receiving first channel downlink messages using the first TCI state, and
   receiving second channel downlink messages using the second TCI state.

2. The method of claim 1, wherein the first downlink message comprises:
   a downlink control information (DCI) including the first TCI state indicator, or
   a medium access control-control element (MAC-CE) including the first TCI state indicator.

3. The method of claim 1, wherein the subsequent downlink messages include downlink data messages and downlink control messages.

4. The method of claim 1, wherein the first downlink message a indicates the first TCI state for a physical downlink shared channel (PDSCH), and the second downlink message indicates the second TCI state for a physical downlink control channel (PDCCH).

5. The method of claim 4, wherein using the respective TCI states for receiving the subsequent downlink messages comprises:
receiving subsequent downlink data messages using the first TCI state until a first indication for a third TCI state for the PDSCH is received; and
receiving subsequent downlink control messages using the second TCI state until a second indication for a fourth TCI state for the PDCCH is received.

6. The method of claim 1, wherein each of the subsequent downlink messages includes a TCI state indicator signaling to the UE to reuse the respective TCI states.

7. The method of claim 1, further comprising:
monitoring for the subsequent downlink messages using the respective TCI states after the timer expires.

8. The method of claim 1, further comprising:
refraining from initiating the timer after receiving each of the subsequent downlink messages.

9. The method of claim 1, further comprising:
initiating the timer after receiving the third downlink message.

10. The method of claim 1, further comprising:
monitoring for the subsequent downlink messages using a preconfigured TCI state before the timer expires.

11. The method of claim 1, wherein each of the subsequent downlink messages includes a respective TCI state indicator, and wherein the UE refrains from initiating the timer after receiving each of the subsequent downlink messages when the respective TCI state indicator indicates a same TCI state as indicated in the first downlink message for the first channel or the second downlink message for the second channel.

12. The method of claim 1, wherein each of the subsequent downlink messages includes a respective TCI state indicator, and wherein the UE refrains from initiating the timer after receiving each of the subsequent downlink messages when the subsequent downlink messages signal to reuse the respective TCI states.

13. The method of claim 1, wherein the first downlink message comprises a medium access control-control element (MAC-CE), and the method further comprises:
transmitting an acknowledgement message associated with the first downlink message;
initiating a second timer after transmitting the acknowledgement message; and
monitoring for the subsequent downlink messages using the respective TCI states after the second timer expires.

14. The method of claim 13, further comprising:
monitoring for the subsequent downlink messages using a preconfigured TCI state before the second timer expires.

15. An apparatus for wireless communication at a user equipment (UE), comprising:
a memory; and
at least one processor coupled to the memory, the at least one processor configured to:
receive, from a base station, a first downlink message including a first transmission configuration indicator (TCI) state indicator indicating a first TCI state for a first channel;
receive a second downlink message including a second TCI state indicator indicating a second TCI state for a second channel;
initiate a timer after receiving the first downlink message including the first TCI state indicator; and
receive, after the timer expires, subsequent downlink messages using respective TCI states until at least a third downlink message including a TCI state change indication is received, wherein receipt of the subsequent downlink messages includes to:
receive first channel downlink messages using the first TCI state, and
receive second channel downlink messages using the second TCI state.

16. The apparatus of claim 15, further comprising:
at least one transceiver coupled to the at least one processor, wherein the first downlink message indicates the first TCI state for a physical downlink shared channel (PDSCH), and the second downlink message indicates the second TCI state for a physical downlink control channel (PDCCH), the at least one processor further configured to:
receive subsequent downlink data messages using the first TCI state until a first indication for a third TCI state for the PDSCH is received; and
receive subsequent downlink control messages using the second TCI state until a second indication for a fourth TCI state for the PDCCH is received.

17. A method of wireless communication at a base station, comprising:
transmitting, to a user equipment (UE), a first downlink message including a first transmission configuration indicator (TCI) state indicator indicating a first TCI state for a first channel;
transmitting a second downlink message including a second TCI state indicator indicating a second TCI state for a second channel;
initiating a timer after transmitting the first downlink message including the first TCI state indicator; and
transmitting, to the UE after the timer expires, subsequent downlink messages based on respective TCI states, wherein transmitting the subsequent downlink messages includes.

18. The method of claim 17, wherein the first downlink message comprises:
a downlink control information (DCI) including the first TCI state indicator, or
a medium access control-control element (MAC-CE) including the first TCI state indicator.

19. The method of claim 17, wherein the subsequent downlink messages include downlink data messages and downlink control messages.

20. The method of claim 17, wherein the first downlink message indicates the first TCI state for a physical downlink shared channel (PDSCH), and the second downlink message indicates the second TCI state for a physical downlink control channel (PDCCH).

21. The method of claim 20, wherein transmitting the subsequent downlink messages includes:
transmitting downlink data messages based on the first TCI state until a first indication of a third TCI state for the PDSCH is transmitted; and
transmitting downlink control messages based on the second TCI state until a second indication of a fourth TCI state for the PDCCH is transmitted.

22. The method of claim 17, wherein each of the subsequent downlink messages includes a TCI state indicator signaling to the UE to reuse the respective TCI states.

23. The method of claim 17, further comprising:
transmitting the subsequent downlink messages based on a preconfigured TCI state before the timer expires.

24. The method of claim 17, further comprising:

refraining from initiating the timer after transmitting each of the subsequent downlink messages.

25. The method of claim 17, further comprising:

initiating the timer after transmitting a third downlink message including an indication of a TCI state change.

26. The method of claim 17, wherein each of the subsequent downlink messages includes a respective TCI state indicator, and wherein the base station refrains from initiating the timer after transmitting each of the subsequent downlink messages when the respective TCI state indicator indicates a same TCI state as indicated in the first downlink message for the first downlink message for the first channel or the second downlink message for the second channel or signals to the UE to reuse the respective TCI states.

27. The method of claim 17, wherein the first downlink message comprises a medium access control-control element (MAC-CE), and the method further comprises:

initiating a second timer after receiving an acknowledgement message associated with the first downlink message, and wherein the base station transmits the subsequent downlink messages using the respective TCI states after the second timer expires or transmitted using a preconfigured TCI state before the second timer expires.

28. An apparatus for wireless communication at a base station, comprising:

a memory; and at least one processor coupled to the memory, the memory and the at least one processor configured to:

transmit, to a user equipment (UE), a first downlink message including a first transmission configuration indicator (TCI) state indicator indicating a first TCI state for a first channel;

transmit a second downlink message including a second TCI state indicator indicating a second TCI state for a second channel;

initiate a timer after transmitting the first downlink message including the first TCI state indicator; and transmit, to the UE after the timer expires, subsequent downlink messages based on respective TCI states, wherein transmission of the subsequent downlink messages includes to:

transmit first channel downlink messages using the first TCI state, and transmit second channel downlink messages using the second TCI state.

29. The apparatus of claim 28, further comprising a transceiver coupled to the at least one processor.

30. The apparatus of claim 15, wherein the first downlink message and the second downlink message are a same downlink message.

* * * * *